US009348362B2

(12) United States Patent
Ko et al.

(10) Patent No.: US 9,348,362 B2
(45) Date of Patent: May 24, 2016

(54) FLEXIBLE PORTABLE TERMINAL

(71) Applicant: Samsung Electronics Co., Ltd., Suwon-si, Gyeonggi-do (KR)

(72) Inventors: Jaehun Ko, Seoul (KR); Sunyoung Kim, Seoul (KR); Junghyun Kim, Seoul (KR); Nakyung Lee, Seoul (KR); Marzio Riboldi, Codogno (IT)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/172,508

(22) Filed: Feb. 4, 2014

(65) Prior Publication Data

US 2014/0226275 A1    Aug. 14, 2014

(30) Foreign Application Priority Data

Feb. 8, 2013    (KR) .................. 10-2013-0014314
Feb. 3, 2014    (KR) .................. 10-2014-0012112

(51) Int. Cl.
*G06F 1/16*    (2006.01)

(52) U.S. Cl.
CPC ............ *G06F 1/1601* (2013.01); *G06F 1/1626* (2013.01); *G06F 1/1652* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,577,496 B1* | 6/2003 | Gioscia et al. | ............. | 361/679.3 |
| 8,502,788 B2* | 8/2013 | Cho | .............. | 345/173 |
| 8,713,759 B2* | 5/2014 | Cai | .................. | 16/366 |
| 8,787,008 B2* | 7/2014 | Walters et al. | ........... | 361/679.21 |
| 8,787,016 B2* | 7/2014 | Rothkopf et al. | ........ | 361/679.55 |
| 8,825,121 B2* | 9/2014 | Aoki et al. | ................. | 455/575.3 |
| 8,842,425 B2* | 9/2014 | Ryu | ........................ | 361/679.27 |
| 8,958,201 B2* | 2/2015 | Leung | ..................... | 361/679.27 |
| 8,971,031 B2* | 3/2015 | Mok et al. | ................ | 361/679.27 |
| 8,971,032 B2* | 3/2015 | Griffin et al. | ............ | 361/679.27 |
| 9,013,864 B2* | 4/2015 | Griffin et al. | ............ | 361/679.21 |
| 9,071,673 B2* | 6/2015 | Choi et al. | | |
| 2007/0146307 A1* | 6/2007 | Kuo et al. | ..................... | 345/107 |
| 2007/0286556 A1* | 12/2007 | Kassamakov et al. | ......... | 385/88 |
| 2012/0002360 A1* | 1/2012 | Seo et al. | .................. | 361/679.01 |
| 2012/0044620 A1* | 2/2012 | Song et al. | ................ | 361/679.01 |
| 2012/0262367 A1* | 10/2012 | Chiu et al. | .................... | 345/156 |
| 2012/0262870 A1 | 10/2012 | Leung | | |
| 2012/0314399 A1* | 12/2012 | Bohn et al. | .................... | 362/97.1 |
| 2013/0021762 A1* | 1/2013 | van Dijk et al. | ............. | 361/749 |
| 2013/0120912 A1* | 5/2013 | Ladouceur et al. | ...... | 361/679.01 |
| 2014/0029171 A1* | 1/2014 | Lee | .......................... | 361/679.01 |
| 2014/0029190 A1* | 1/2014 | Sato et al. | ................ | 361/679.27 |
| 2014/0123436 A1* | 5/2014 | Griffin et al. | ................... | 16/221 |
| 2014/0362513 A1* | 12/2014 | Nurmi | ...................... | 361/679.27 |

FOREIGN PATENT DOCUMENTS

EP    1 785 805 A2    5/2007

* cited by examiner

*Primary Examiner* — Lisa Lea Edmonds
(74) *Attorney, Agent, or Firm* — Jefferson IP Law, LLP

(57) ABSTRACT

A flexible portable terminal is provided. The flexible portable terminal includes a folding portion configured to bend at one end of a body of the flexible portable terminal in a direction to a front surface or a rear surface of the flexible portable terminal, a flexible display unit configured to be mounted on the body of the flexible portable terminal, and to bend in the front surface or the rear surface of the flexible portable terminal according to a bending direction of the folding portion, and a sliding portion configured to enable one end of the flexible display unit to slide according to a difference of a compression/tension caused by a difference of an elongation between the folding portion and the flexible display unit when the folding portion is bent.

20 Claims, 22 Drawing Sheets

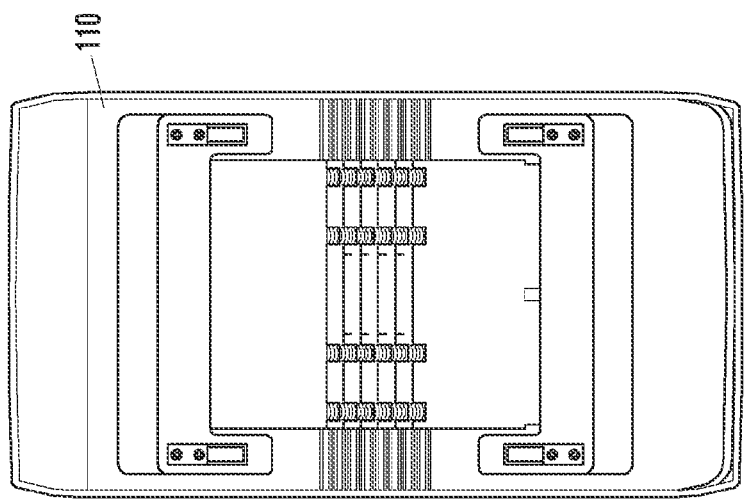
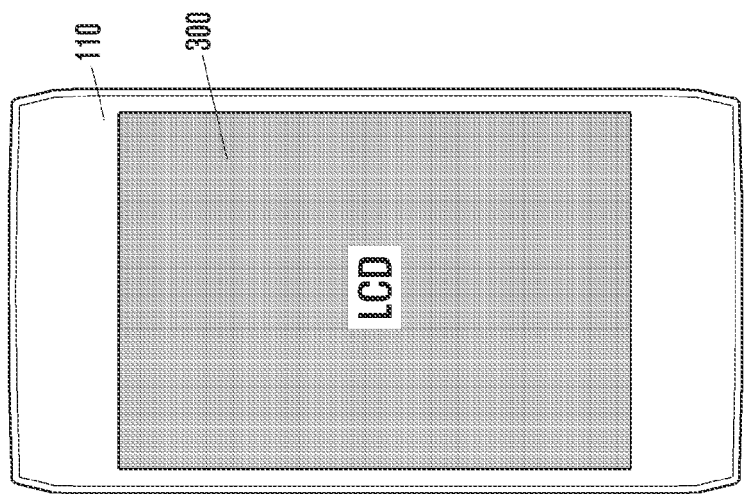
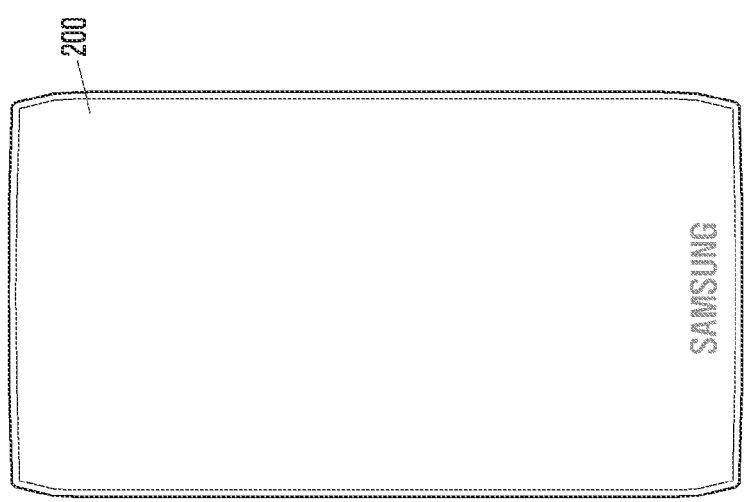

3 :7

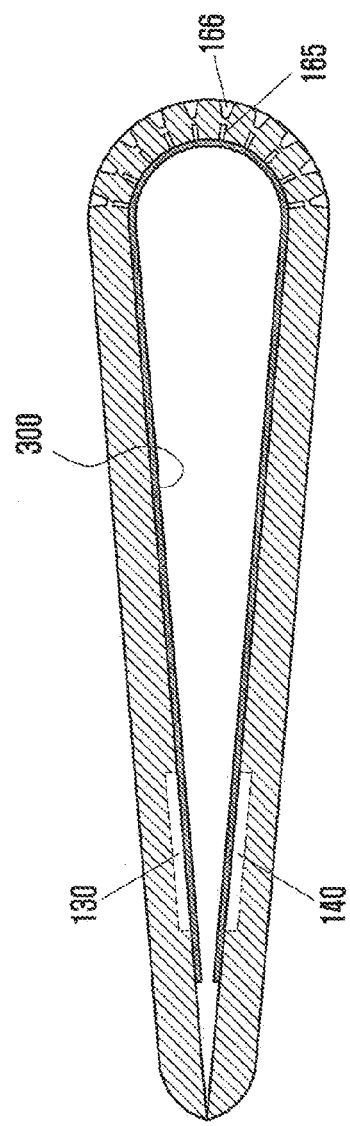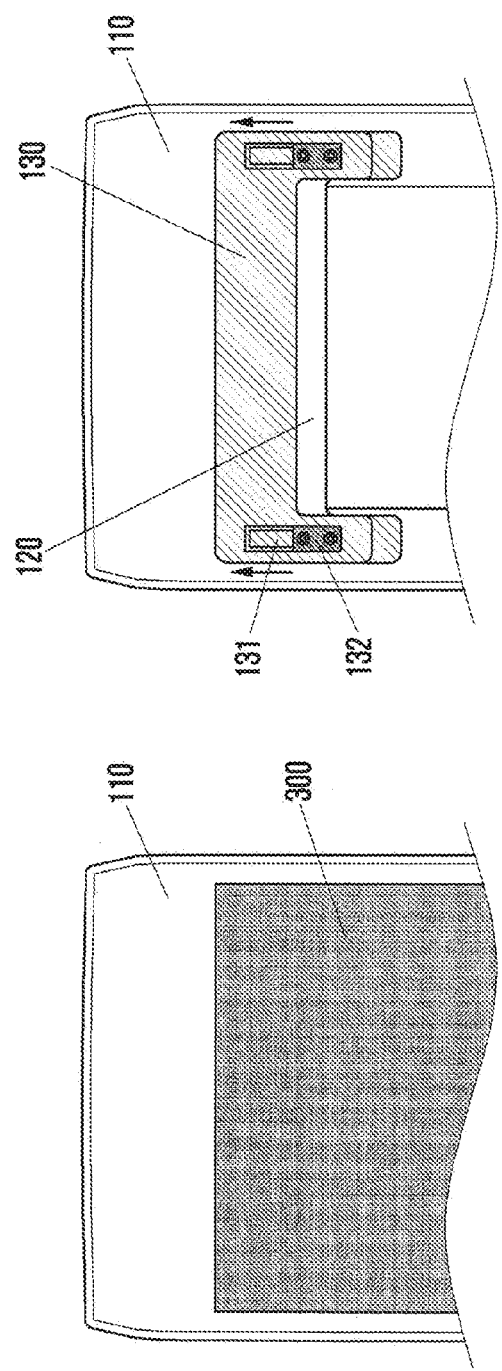
FIG. 13A
FIG. 13B
FIG. 13C

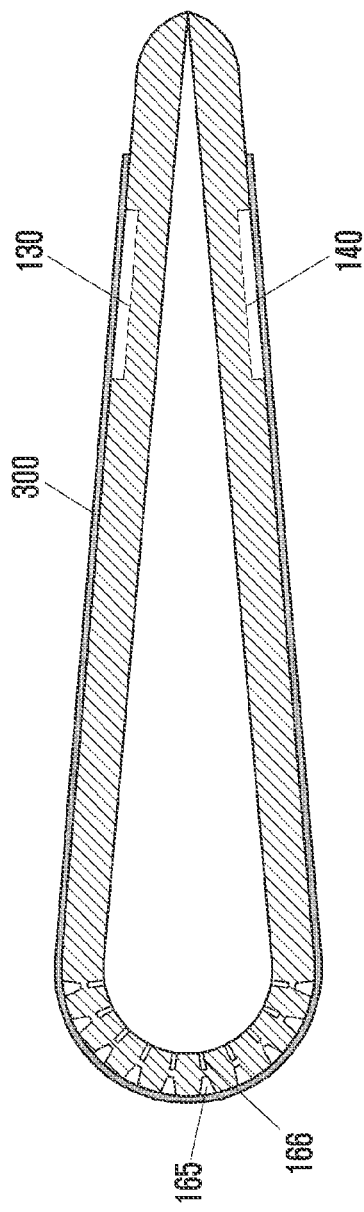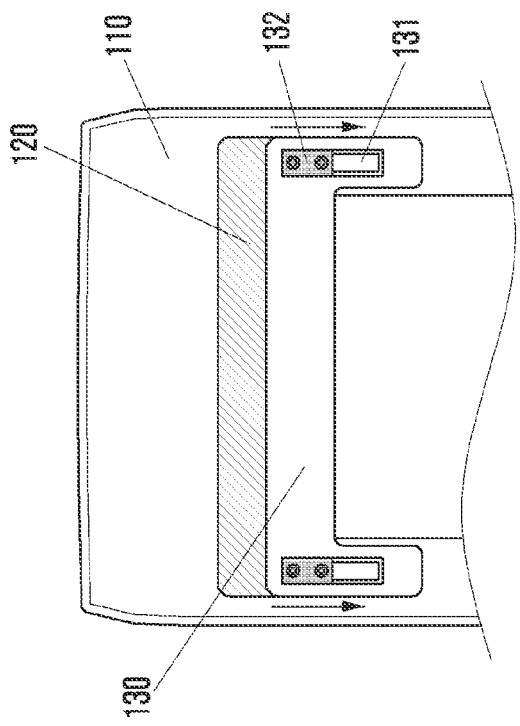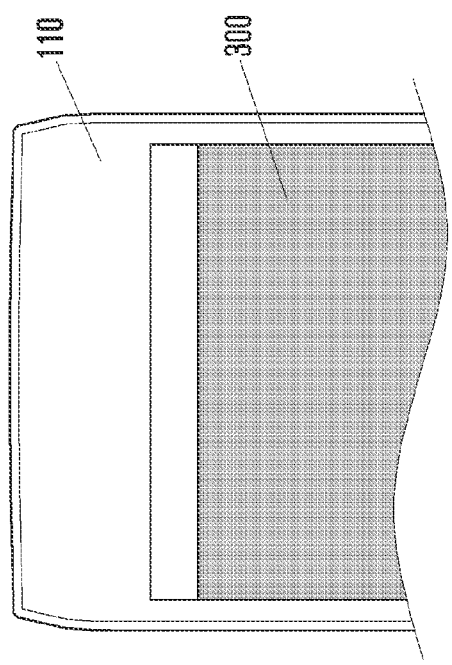

FLEXIBLE PORTABLE TERMINAL

CROSS-REFFERENCE TO RELATED APPLICATION(S)

This application claims the benefit under 35 U.S.C. §119 (a) of a Korean patent application filed on Feb. 8, 2013 in the Korean Intellectual Property Office and assigned Serial number 10-2013-0014314, and of a Korean patent application filed on Feb. 3, 2014 in the Korean Intellectual Property Office and assigned Serial number 10-2014-0012112, the entire disclosure of each of which is hereby incorporated by reference.

TECHNICAL FIELD

The present disclosure relates to a flexible portable terminal. More particularly, the present disclosure relates to a flexible portable terminal capable of bending or folding in a direction to a front surface or a rear surface thereof without a flexible display unit being separated from the flexible portable terminal or being damaged.

BACKGROUND

Development of a display field of various types of portable terminals has been advancing as the use of the portable terminals to access information increases. Accordingly, various display devices have been developed and introduced to meet the development of the display field.

A Liquid Crystal Display (LCD) device, a Plasma Display Panel (PDP) device, a Field Emission Display (FED) device, an Electro Luminescence Display (ELD) device, and the like, have been evolving into thin, light, and low electricity consuming devices.

Their common feature is that they are implemented in a flat shape by using a rigid substrate, such as a glass plate, and the like. Accordingly, in a current technical level, if some core technologies are developed to be adapted to a flexible display device (e.g., substituting a flexible and transparent substrate for the glass substrate), the flexible display device can be manufactured immediately.

Similarly, when such a flexible display device is applied to electronic devices, flexible electronic devices can be quickly developed.

Therefore, as the flexible display device has been developed, the development of a portable terminal, a monitor, a Television receiver (TV), and the like, to which the flexible display can be applied, is also needed.

For example, with a structure of an electronic device employing the flexible display device, a development of a structure which could complement the electronic device and the flexible display device is needed so that the electronic device can be prevented from being separated or damaged due to a difference of an elongation between the electronic device and the flexible display device when the electronic device is bent and folded.

Therefore, a need exists for a flexible portable terminal capable of bending or folding in a direction to a front surface or a rear surface thereof without a flexible display unit being separated from the flexible portable terminal or being damaged.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible terminal capable of bending or folding in a direction to a front surface or a rear surface thereof without a flexible display unit being separated from a flexible portable terminal or being damaged.

Another aspect of the present disclosure is to provide a flexible portable terminal in which a folding structure is implemented by forming an uneven structure on the portable terminal, thereby preventing an increase of an overall thickness of the flexible portable terminal without a part for bending the portable terminal separately added. Further, still another aspect of the present disclosure is to provide a flexible portable terminal that can be easily manufactured and that a user can conveniently carry and use.

In accordance with an aspect of the present disclosure, a flexible portable apparatus is provided. The apparatus includes a folding portion configured to bend at one end of a body of a flexible portable terminal in a direction to a front or a rear surface of the flexible portable terminal, a flexible display unit configured to be mounted on the body of the flexible portable terminal, and to bend in the front or the rear surface of the flexible portable terminal according to a bending direction of the folding portion, and a sliding portion configured to enable one end of the flexible display unit to slide according to a difference of a compression/tension caused by a difference of an elongation between the folding portion and the flexible display unit when the folding portion is bent.

In accordance with another aspect of the present disclosure, a flexible portable apparatus is provided. The flexible portable apparatus includes a flexible display unit configured to output a display screen by a flexible portable terminal, and a body having one surface on which a folding structure is formed to bend upper and lower portions of the flexible portable terminal at a desired angle in a direction to a front surface or a rear surface of the flexible portable terminal, wherein a sliding structure is disposed on the other surface to make one end of the flexible display unit slide according to the bending of the flexible portable terminal.

The features and technical merits are widely summarized so that the above-mentioned contents are better understood by one of ordinary skill in the art from the detailed description of the present disclosure described below.

The flexible portable terminal of the present disclosure can be bent at different angles in a front direction or a rear direction but is not limited thereto.

More particularly, when the flexible portable terminal is bent, an end of the flexible display device is enabled to slide according to a compression and an extension of the flexible display device caused by a difference of elongation between a bending portion of a body of the portable terminal and the flexible display device, thereby preventing the flexible display device from being separated from the body of the portable terminal or being damaged.

Further, the present disclosure maintains a bending state by variously adjusting a ratio of an upper portion to a lower portion of the flexible portable terminal, thereby allowing the manufacture of various flexible portable terminals with various ratios, and facilitating the operation and convenience of carrying the flexible portable terminal.

In addition, in the structure of maintaining the folding state of the flexible portable terminal according to the present disclosure, magnetism is removed from the flexible portable terminal, thereby having no electric and physical effects on functions and operation of the portable terminal, and improving reliability of the flexible portable terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A, 1B, and 1C illustrate a front surface and a rear surface of a flexible portable terminal according to an embodiment of the present disclosure;

FIGS. 13A, 13B, and 13C illustrate a flexible portable terminal bent in a front direction according to an embodiment of the present disclosure;

FIGS. 14A, 14B, and 14C illustrate a flexible portable terminal bent in a rear direction according to an embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In an embodiment of the present disclosure, the portable terminal may be applied to all information and communication devices, multimedia devices and applications thereof, such as a tablet Personal Computer (PC), a mobile communication terminal, a mobile phone, a Personal Digital Assistant (PDA), a smart phone, an International Mobile Telecommunication 2000 (IMT-2000) terminal, a Code Division Multiple Access (CDMA) terminal, a Wideband Code Division Multiple Access (WCDMA) terminal, a Global System for Mobile communication (GSM) terminal, a General Packet Radio Service (GPRS) terminal, an Enhanced Data rates for GSM Evolution (EDGE) terminal, an Universal Mobile Telecommunication Service (UMTS) terminal, a digital broadcasting terminal, an Automated Teller Machine (ATM), and the like.

Figure 2:
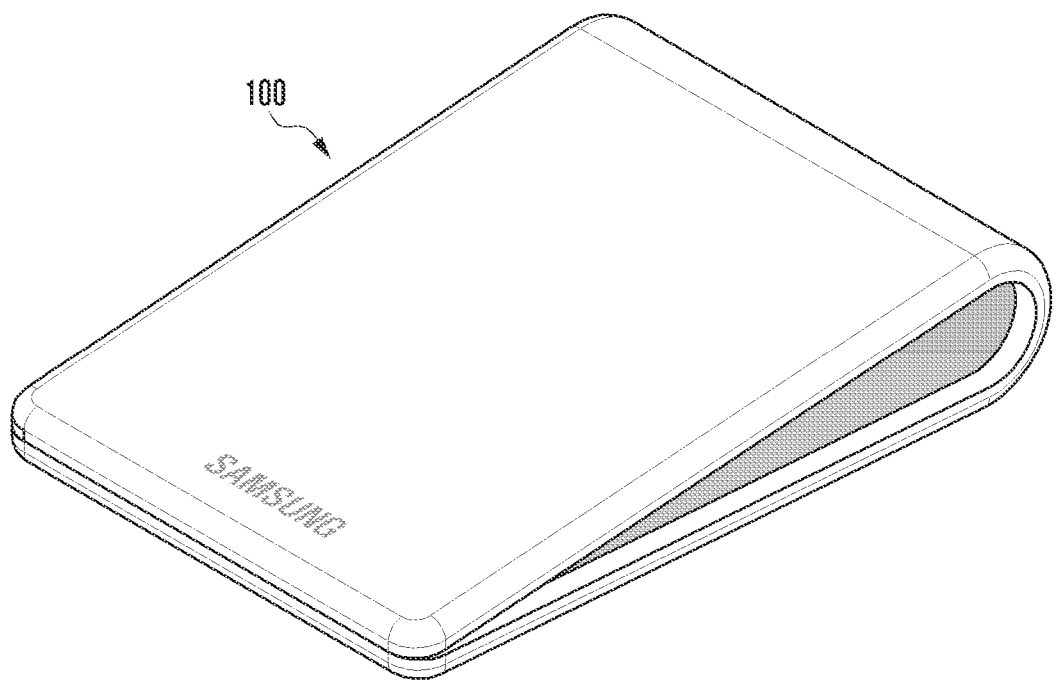
FIG. 2 illustrates a flexible portable terminal, in which the flexible portable terminal is folded according to an embodiment of the present disclosure.
Figure 3:
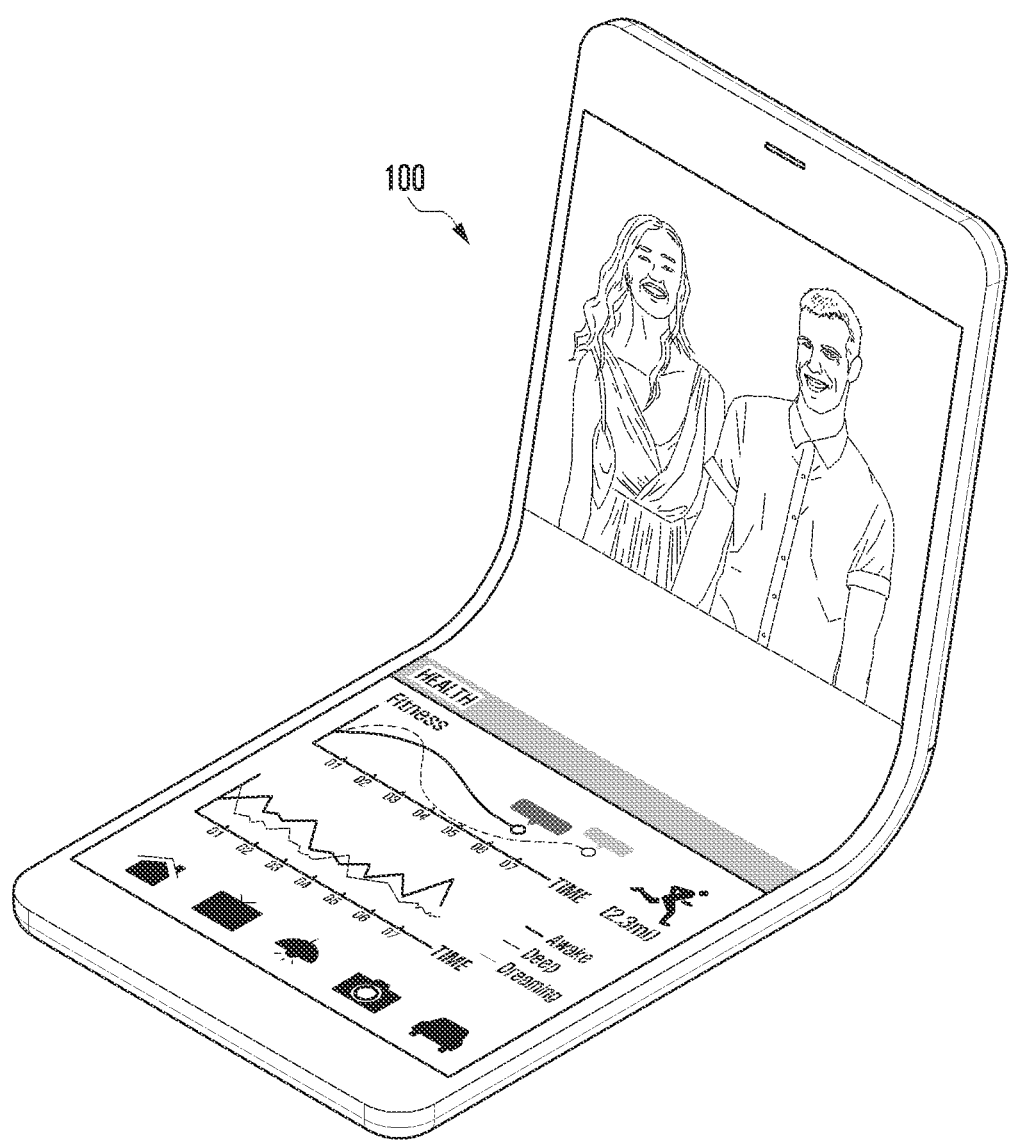
FIGS. 3 and 4 illustrate a flexible portable terminal bent in a front direction according to an embodiment of the present disclosure.
Figure 4:
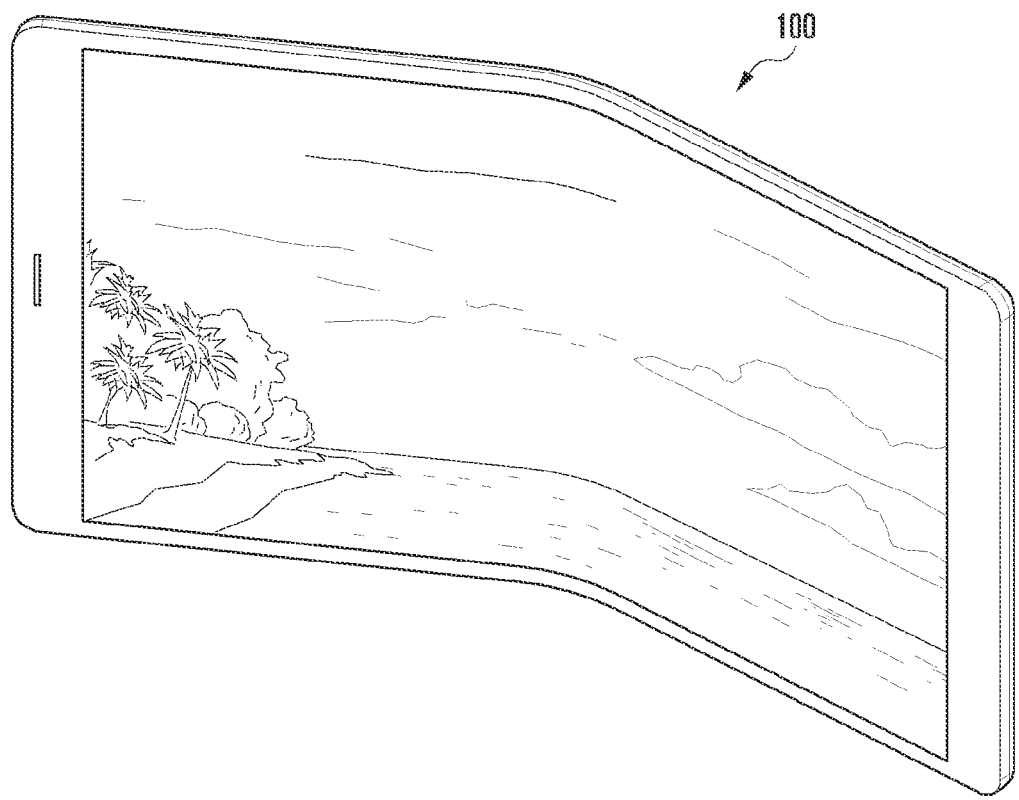
Figure 5:
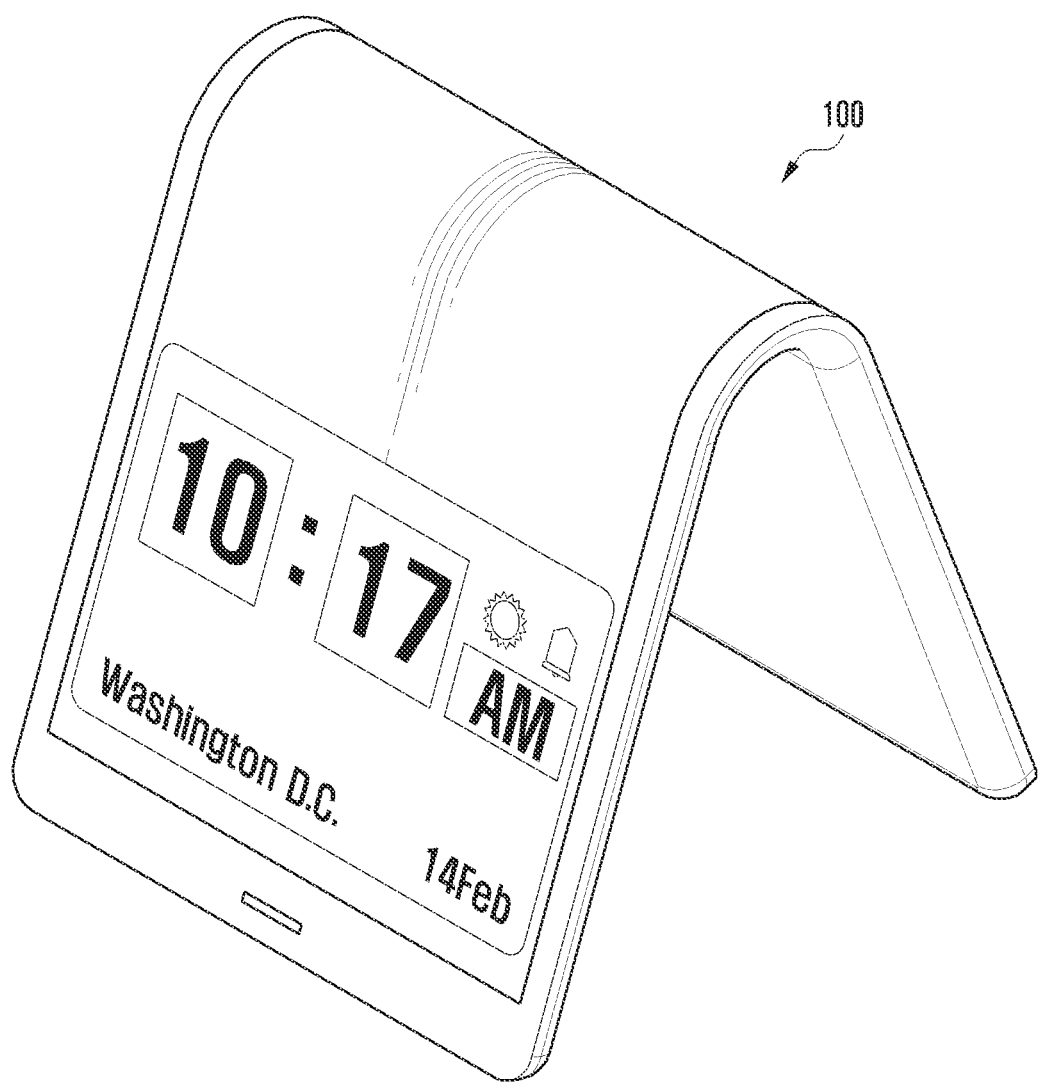
FIG. 5 illustrate a flexible portable terminal bent in a rear direction according to an embodiment of the present disclosure.

FIGS. 1A, 1B, and 1C illustrate a front surface and a rear surface of a flexible portable terminal according to an embodiment of the present disclosure. FIG. 2 illustrates a flexible portable terminal, wherein the flexible portable terminal is bent according to an embodiment of the present disclosure. FIGS. 3 and 4 illustrate a flexible portable terminal bent in a front direction according to an embodiment of the present disclosure. FIG. 5 illustrate a flexible portable terminal bent in a rear direction according to an embodiment of the present disclosure.

Referring to FIGS. 1A, 1B, and 1C, a flexible portable terminal 100 may include a body 110 thereof, and a flexible display unit 300 mounted on a front surface of the body 110 thereof.

The body 110 of the flexible portable terminal 100 may include a plurality of electronic parts constituting the flexible portable terminal 100 on the inside and the outside thereof For example, a Printed Circuit Board (PCB) or a flexible substrate which is a thin plate and on which the electronic parts, such as an Integrated Circuit (IC), a camera, a Secure Digital (SD) card, a Subscriber Identification Module (SIM) card, antennas, and the like, are mounted may be disposed on the inside and the outside of the body 110.

The body 110 of the flexible portable terminal 100 may be made of a hard non-metal material, such as Acrylonitrile-Butadiene-Styrene resin, Polycarbonate (PC) resin, Polyoxymethylene (POM) acetal resin, and the like, which are plastic resin compositions, but the material of the body 110 of the flexible portable terminal 100 is not limited thereto. The flexible display unit 300 may be attached, mounted, adhered on a front surface of the body 110 of the flexible portable terminal. For example, the flexible display unit 300 may be partially adhered to a part of the front surface of the body 110 using a double sided tape, an adhesive agent, and the like.

An edge of the flexible display unit 300 may be covered with a notch 222 (see FIG. 6B) formed on the body 110 of the flexible portable terminal 100 in order to prevent any separation, deformation, damage, and the like, of the flexible display unit 300. The flexible display unit 300 may be composed of a display device formed on the thin flexible substrate instead of an existing glass substrate.

For example, the flexible display unit 300 may include at least one of a Liquid Crystal Display (LCD) unit, an Organic Light Emitting Diode (OLED) display unit, an Electrophoretic Display (EPD) unit, and the like.

A cover 200 of the flexible portable terminal 100 may be adhered to the rear surface of the body 110 of the flexible portable terminal 100, and may be made of a soft material including at least one of rubber, urethane, silicon, leather, Thermoplastic Elastomer (TPE), Thermoplastic polyurethane (TPU), and the like, or at least one combination thereof.

The flexible portable terminal 100 is bent in a direction of the front surface thereof as shown in FIG. 2, is maintained in a bent state and is positioned like a laptop computer in the bent state as shown in FIG. 3, is positioned like a book in the bent state as shown in FIG. 4, and is maintained in a bent state in a direction to the rear surface thereof as shown FIG. 5.

The structure of the flexible portable terminal 100 will be described with reference to FIGS. 6A, 6B, and 7.

Figure 6A:
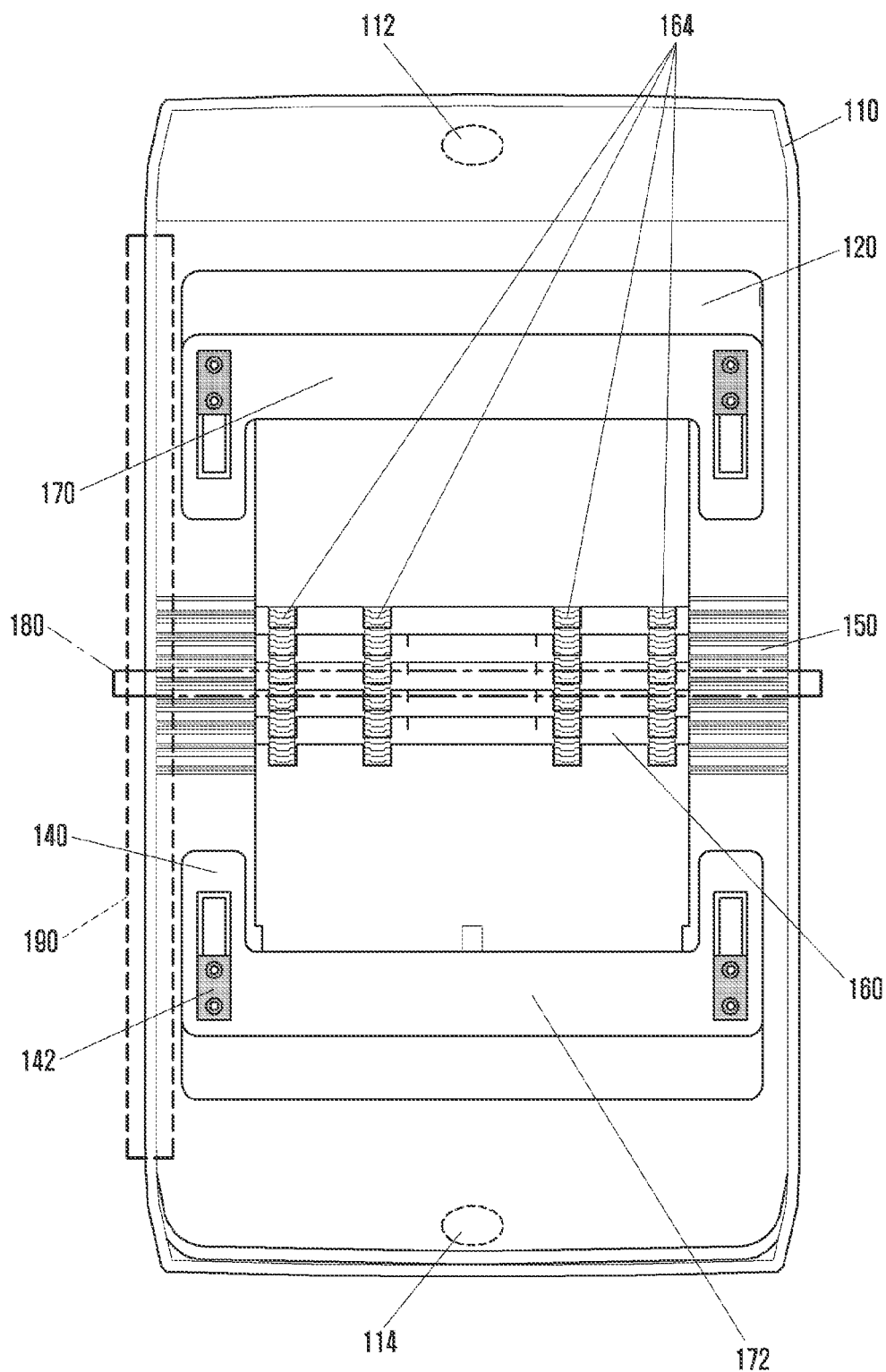
FIG. 6A illustrates a structure of a front surface of a flexible portable terminal according to an embodiment of the present disclosure.
Figure 6B:
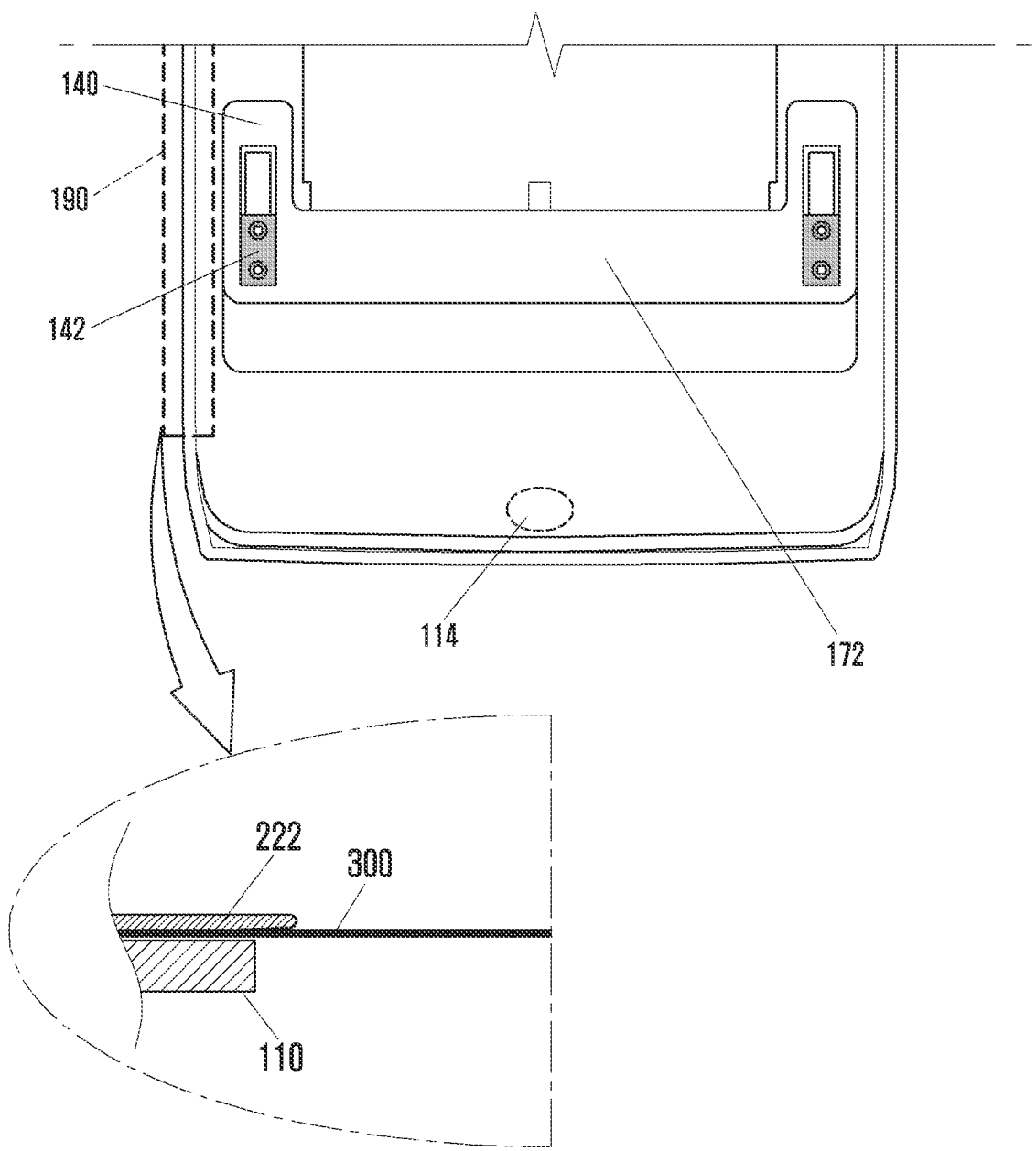
FIG. 6B illustrates a part of an edge of a flexible portable terminal according to an embodiment of the present disclosure.
Figure 7:
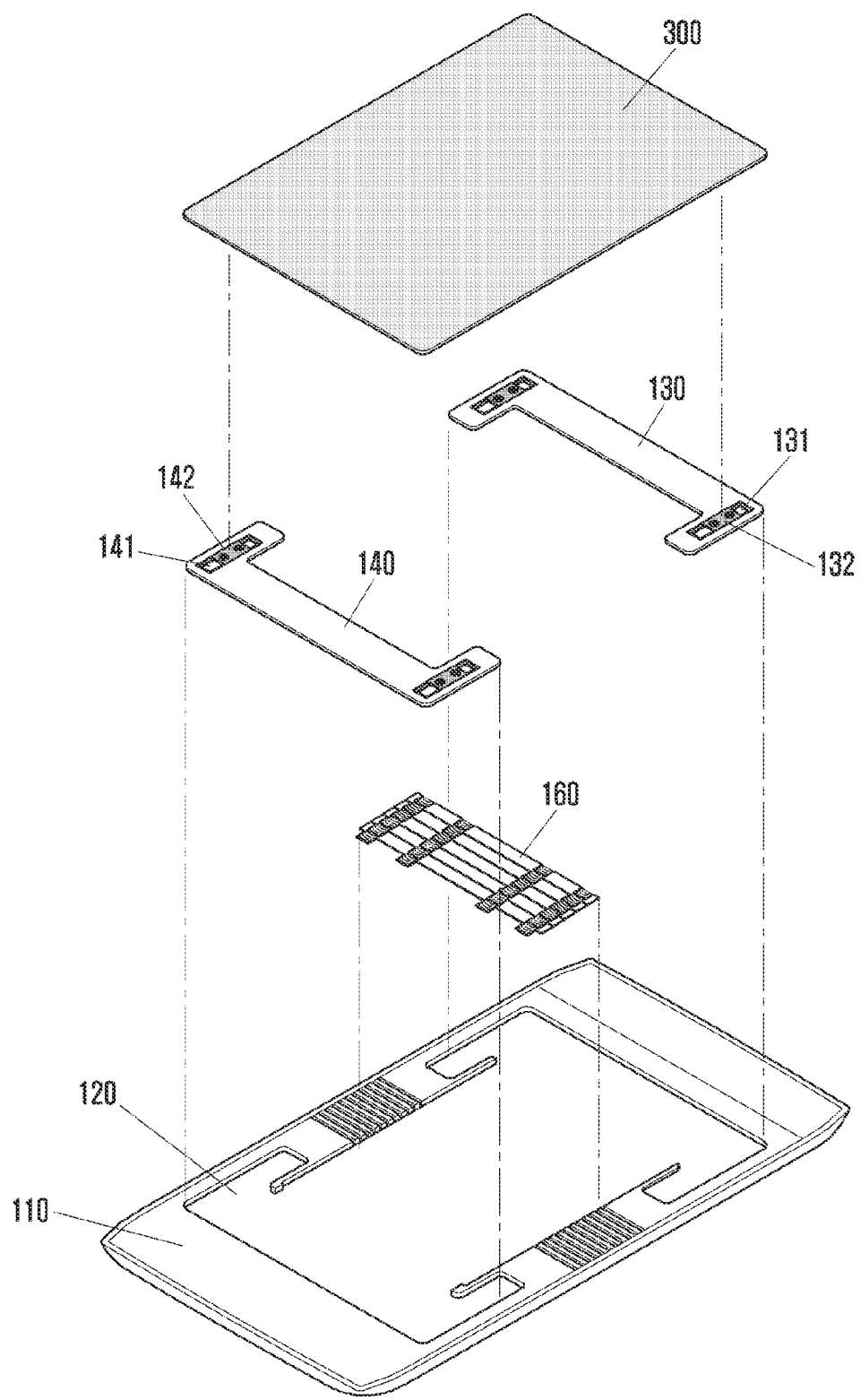
FIG. 7 illustrates an exploded perspective view of a flexible portable terminal according to an embodiment of the present disclosure.

FIG. 6A illustrates a structure of a front surface of a flexible portable terminal according to an embodiment of the present disclosure, FIG. 6B illustrates a part of an edge of a flexible portable terminal of the present disclosure, and FIG. 7 illustrates an exploded perspective view of a flexible portable terminal according to an embodiment of the present disclosure.

Referring to FIGS. 6A and 7, the flexible portable terminal 100 includes a body 110 thereof, and the flexible display unit 300 mounted on the front surface of the body 110.

The body 110 of the flexible portable terminal 100 includes folding portions 150 and 160 which are disposed at an intermediate portion and allow the flexible portable terminal 100 to be bent or folded in a direction to the front surface or the rear surface of the flexible portable terminal 100. The folding portions 150 and 160 are formed at the intermediate portion of the body 110 of the flexible portable terminal 100 and have flexibility, which are bent within an angle of 360 degrees so as to function as a hinge around which the flexible portable terminal 100 can be folded and expanded.

As shown in FIG. 6A, the folding portions 150 and 160 may be formed in a center region of the body 110 of the flexible portable terminal 100, and may be formed to extend in directions to an upper portion and a lower portion of the body 110 of the flexible portable terminal 100 in the same proportion or a different proportion. However, an arrangement region of the folding portions 150 and 160 may be limited thereto.

The folding portions 150 and 160 may be separately formed by dividing them into the folding portion 150 formed inside the body 110 of the flexible portable terminal 100 and the folding portion 160 formed outside the body 110 of the flexible portable terminal 100, or may be integrally formed. In an embodiment of the present disclosure, the integrated folding portion will be described for convenience in the description, but as shown in FIG. 7, it is noted that the separated folding portions 150 and 160 may be implemented.

The body 110 of the flexible portable terminal 100 further includes a hook 112 disposed at one end of the edge, and a hook groove 114 formed at the other end which is opposite to and is coupled with the one end when the flexible portable terminal 100 is folded. The flexible portable terminal 100 may be maintained in the folded state by the coupling of the hook 112 with the hook groove 114 as described above.

The upper sliding portion may include an upper slider 170, an upper slot 120 for defining a sliding range of the upper slider 170, and guide portions 131 and 132 for preventing the upper slider 170 from being separated. The lower sliding portion also includes a lower slider 172, a lower slot 122, and guide portions 141 and 142.

Hereinafter, the structure of the folding portion 160 will be described with reference to FIGS. 9, 10A, 10B, 10C, 11A, 11B, 11C, and 11D.

Figure 9:
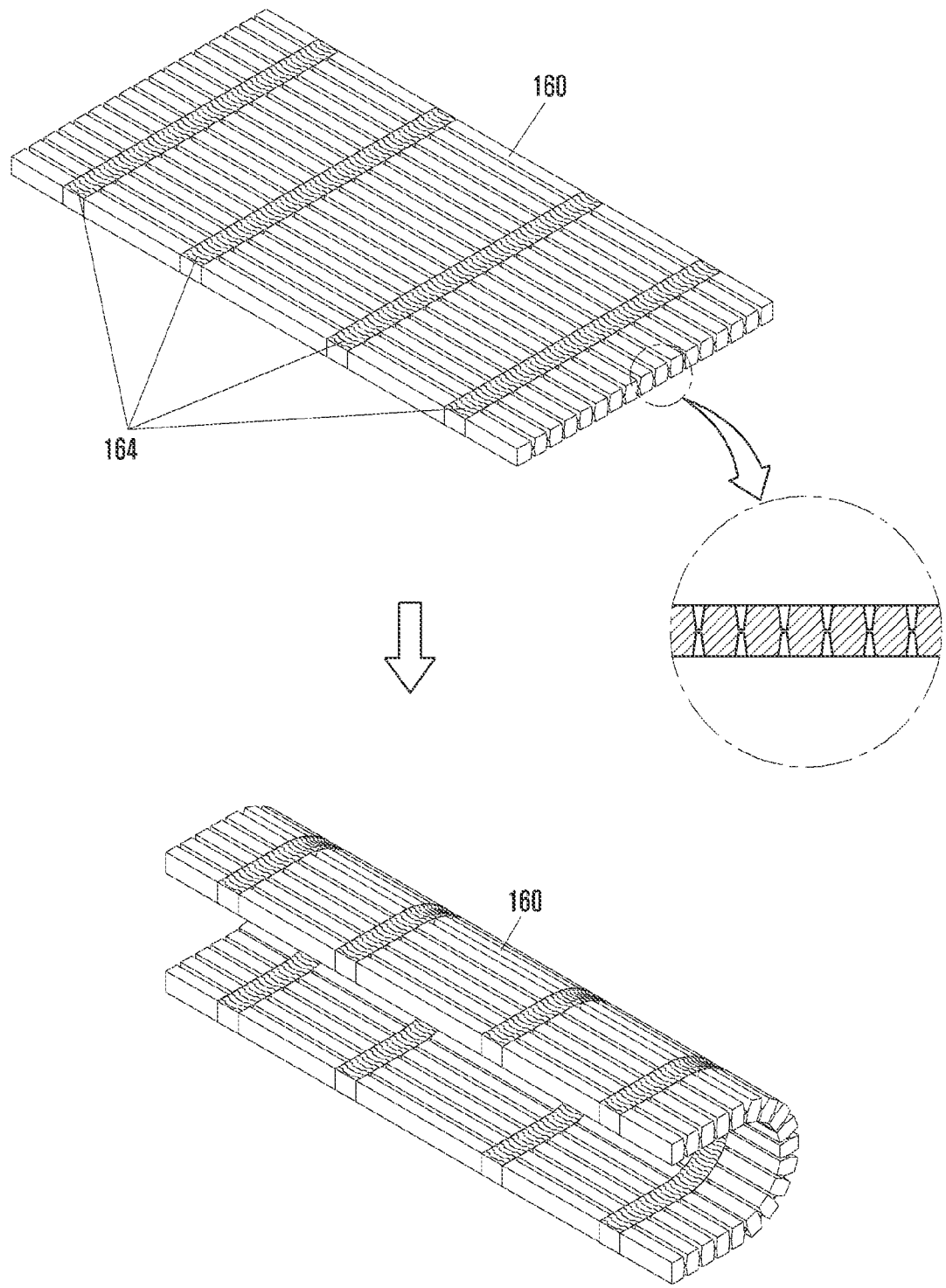
FIG. 9 illustrates a bending portion of a flexible portable terminal according to an embodiment of the present disclosure.

FIG. 9 illustrates a bending portion of a flexible portable terminal according to an embodiment of the present disclosure.

Referring to FIG. 9, the folding portion 160 may be formed on the body 110 of the flexible portable terminal 100, or may be formed to be separated from the body 110 of the flexible portable terminal 100 and coupled with the body 110.

The folding portion 160 may have a section on the front and rear surfaces with an uneven structure. The folding portion 160 according to the embodiment of the present disclosure has an uneven structure of a saw-tooth at a bent portion thereof, thereby improving an elongation, which is a proportion in which a material is elongated when the material is bent, and flexibility.

Further, the folding portion 160 allows the flexible portable terminal 100 to be folded or bent in the direction to the front surface or the rear surface by the uneven front and rear surfaces, i.e., both surfaces.

Figure 8:
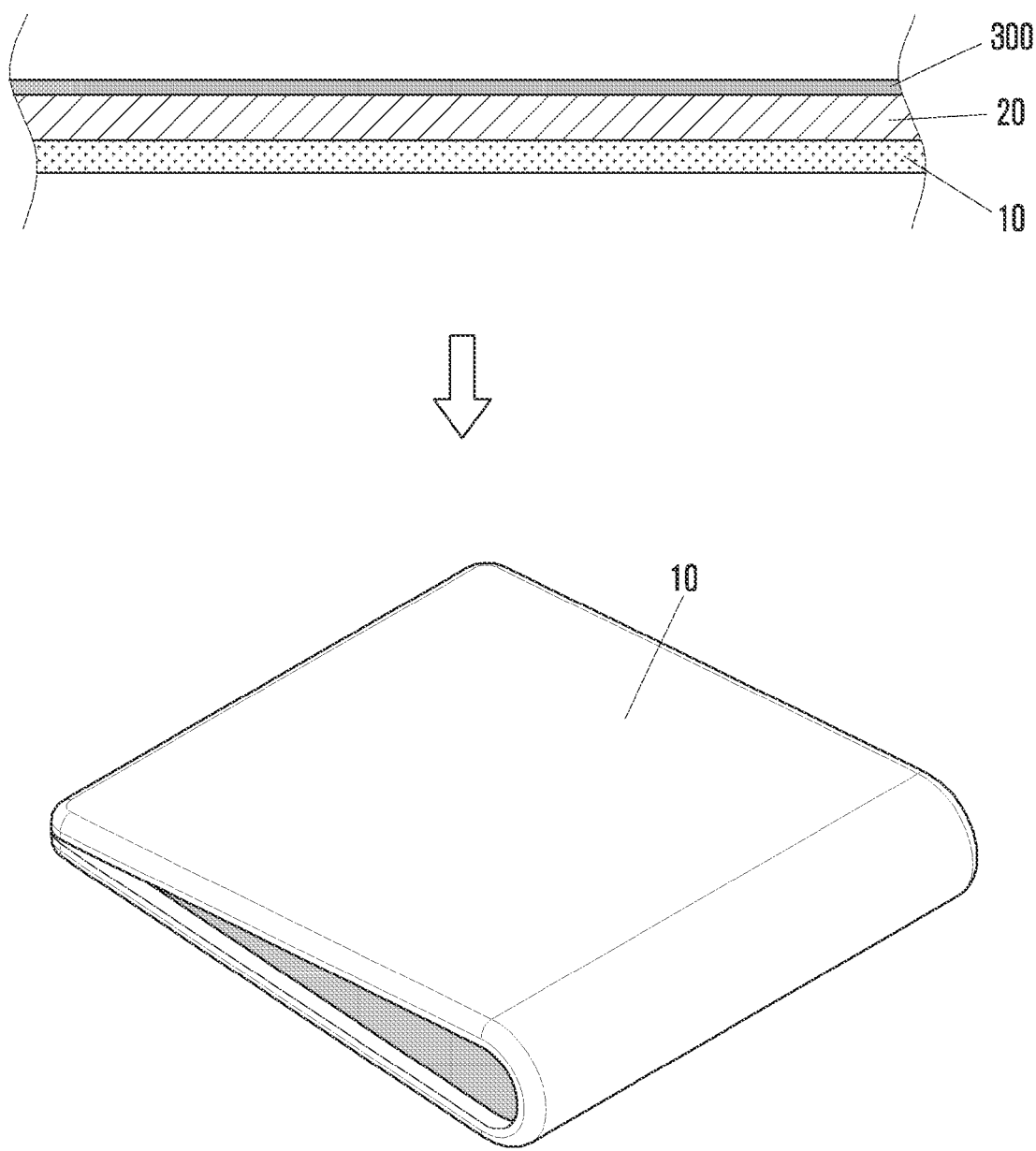
FIG. 8 illustrates a flexible display device mounted on a general portable terminal according to an embodiment of the present disclosure.

FIG. 8 illustrates a flexible display device mounted on a general portable terminal according to an embodiment of the present disclosure.

Referring to FIG. 8, in comparison with a hard material 20 having a section without the uneven structure shown in FIG. 8, it is understood that the folding portion 160 having a saw-tooth structure can be extended more easily at a bending portion when bent. Moreover, the hard material 20 may attach a soft material 10.

Further, since such a folding portion 160 is implemented in the flexible portable terminal 100 by forming the uneven structure on the body 110 of the flexible portable terminal 100, the flexible portable terminal 100 need not have more units, such as a hinge, and has no electromagnetic effect on the parts thereof although an overall thickness of the flexible portable terminal is not increased.

Figure 10A:
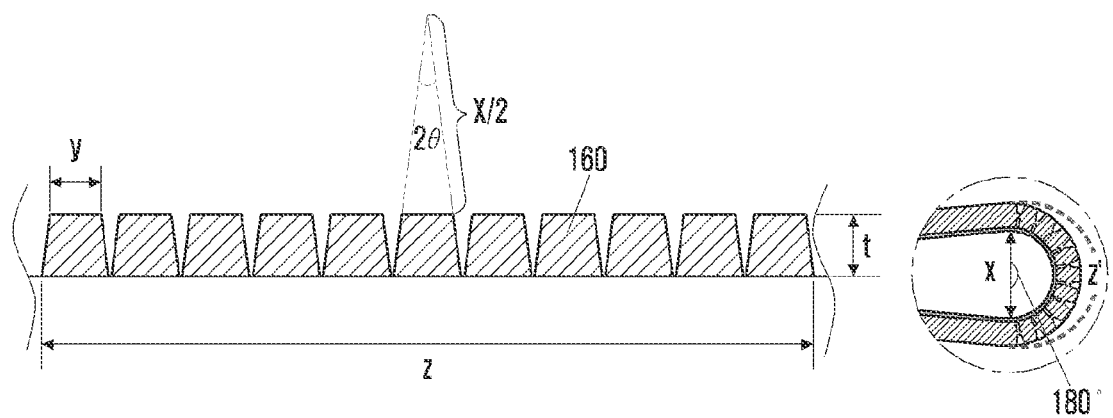
FIGS. 10A, 10B, and 10C illustrate a bending structure formed as a folding portion on a front surface and a rear surface of a flexible portable terminal according to an embodiment of the present disclosure.
Figure 10B:
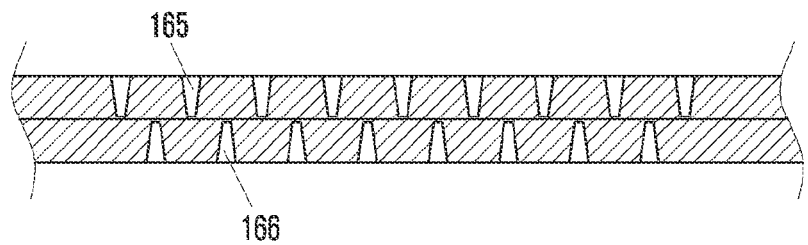
Figure 10C:
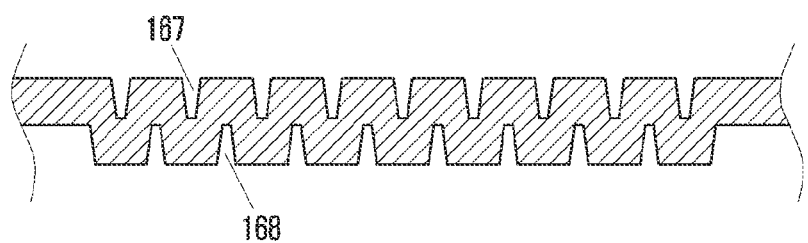

FIGS. 10A, 10B, and 10C illustrate a bending structure formed as a folding portion on a front surface and a rear surface of a flexible portable terminal according to an embodiment of the present disclosure.

Referring to FIGS. 10A, 10B, and 10C, sectional views of the flexible portable terminal 100 illustrating a minimum condition establishing the structure in order to prevent any damage of the flexible display unit 300 when the flexible portable terminal 100 is bent and folded are provided.

According to the embodiment of the present disclosure, when the flexible portable terminal 100 is bent or folded, a minimum value which the flexible display unit 300 needs to maintain may be determined based on at least one of a length of a topside of the folding portion 160, a thickness of the folding portion 160, a number of the folding portion 160, a length of a saw-tooth and an angle between adjacent prominences.

Further, according to the embodiment of the present disclosure, referring to FIG. 10A, a minimum radius value x may be maintained in order to prevent the bending portion of the flexible display unit 300 from being damaged when the flexible portable terminal 100 is bent or folded. Further, a below description may be Equations to maintain a limit bending of the flexible display unit 300. Here, it is assumed that the folding portion 160 is relatively made of a hard material 20, and the cover 200 of the flexible portable terminal 100 is made of a soft material.

According to the embodiment of the present disclosure, if a radius to maintain a value of the limit bending of the flexible display unit 300 is defined by x when the flexible portable terminal 100 is folded, a length of a topside of a saw-tooth structure is y, the thickness of the hard material 20 is t, the length of a saw-tooth is Z, the length of a curved surface is Z' and the number of the saw-tooth structure is n. If an angle between the saw teeth (arc) is 2θ, a value of x may be calculated using Equations below.

For example, the length of a topside of a saw-tooth structure may be determined based on Equation (1) below, by calculating the value of x and a sin θ.

$$y = x \times \sin\theta \qquad \text{Equation (1)}$$

Additionally, for example, if the number of the saw-tooth structure is one, the angle between the saw teeth (arc) is 2θ. Accordingly, if the flexible portable terminal 100 is totally bent and folded and the angle is 180°, the number of the saw-tooth may be determined based on Equation (2) below.

$$n = 90°/\theta \qquad \text{Equation (2)}$$

Additionally, for example, if the flexible portable terminal 100 is totally bent and folded and the length of a saw-tooth is identical to the length of a curved surface, the length of a saw-tooth is determined based on Equation (3) below.

$$Z = 2 \times (x/2 \times \cos\theta + t) \times (\theta/360°) \times \pi = (\theta/180°) \times (x/2 \times \cos\theta + t) \times \pi \qquad \text{Equation (3)}$$

A designer can adjust the number of the saw-tooth structures of the folding portion 160 or the thickness of the hard material 20 in order to prevent any damage of the flexible display unit 300 when the flexible portable unit is folded.

On the other hand, the uneven structure of the folding portion 160 is formed such that etched portions on the front and rear surfaces are opposite to each other as shown in FIG. 10A, or such that etched portions 165 and 166 on the front and rear surfaces alternate with each other as shown in FIG. 10B. Further, the uneven structure may be formed in such a manner that the body 110 of the flexible portable terminal 100 is partially divided into the front surface and the rear surface and then edges of the divided front and rear surfaces are coupled with each other (167 and 168). However, as shown in FIG. 10C, the uneven structure may be partially formed on the front and rear surfaces of the body 110 of the integral and flexible portable terminal.

Referring back to FIG. 9, the folding portion 160 may be further provided with at least one free stop hinge unit 164 to maintain the bent or folded state of the flexible portable terminal 100.

The free stop hinge units 164 are disposed to cross the uneven structure on the front surface of the folding portion 160, and formed to have a thickness identical to the highest height of the uneven structure, thereby preventing an increasing of an overall thickness of the flexible portable terminal.

Although an arrangement in which the free stop hinge units 164 extend across the uneven structure on the front surface is shown in the drawings of the present disclosure, the arrangement is not limited thereto and the free stop hinge units 164 may be arranged across the uneven structure on the rear surface. Furthermore, the free stop hinge units 164 may be mounted on both edges in a region in which the flexible portable terminal 100 is bent.

The free stop hinge units 164 may be made of, for example, a shape memory alloy, a spring, a hinge structure, and the like, and are not limited thereto. Any element which can maintain the bent state of the folding portion 160 may be employed as the free stop hinge units 164.

FIGS. 11A, 11B, 11C, and 11D illustrate a bending state of a flexible portable terminal according to an embodiment of the present disclosure.

Figure 11A:
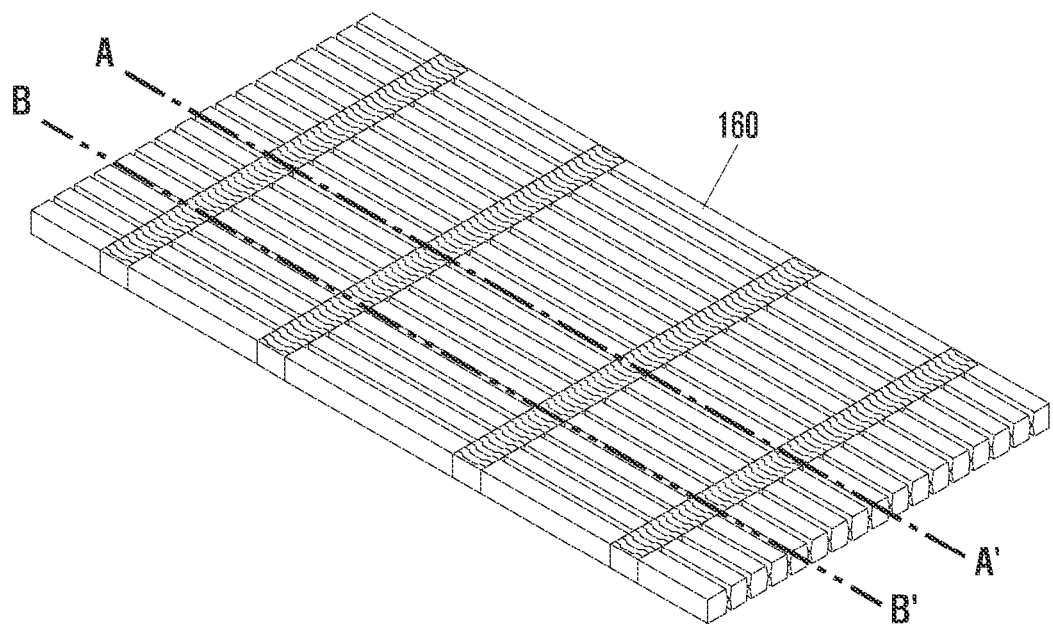
FIGS. 11A, 11B, 11C, and 11D illustrate a bending state of a flexible portable terminal according to an embodiment of the present disclosure.

Referring to FIG. 11A, for example, it may be assumed that the folding portion 160 is disposed at a central region of the body 110 of the flexible portable terminal 100 and a plurality of uneven structures are included in the front and rear surfaces of the body 110 of the flexible portable terminal 100.

Figure 11B:
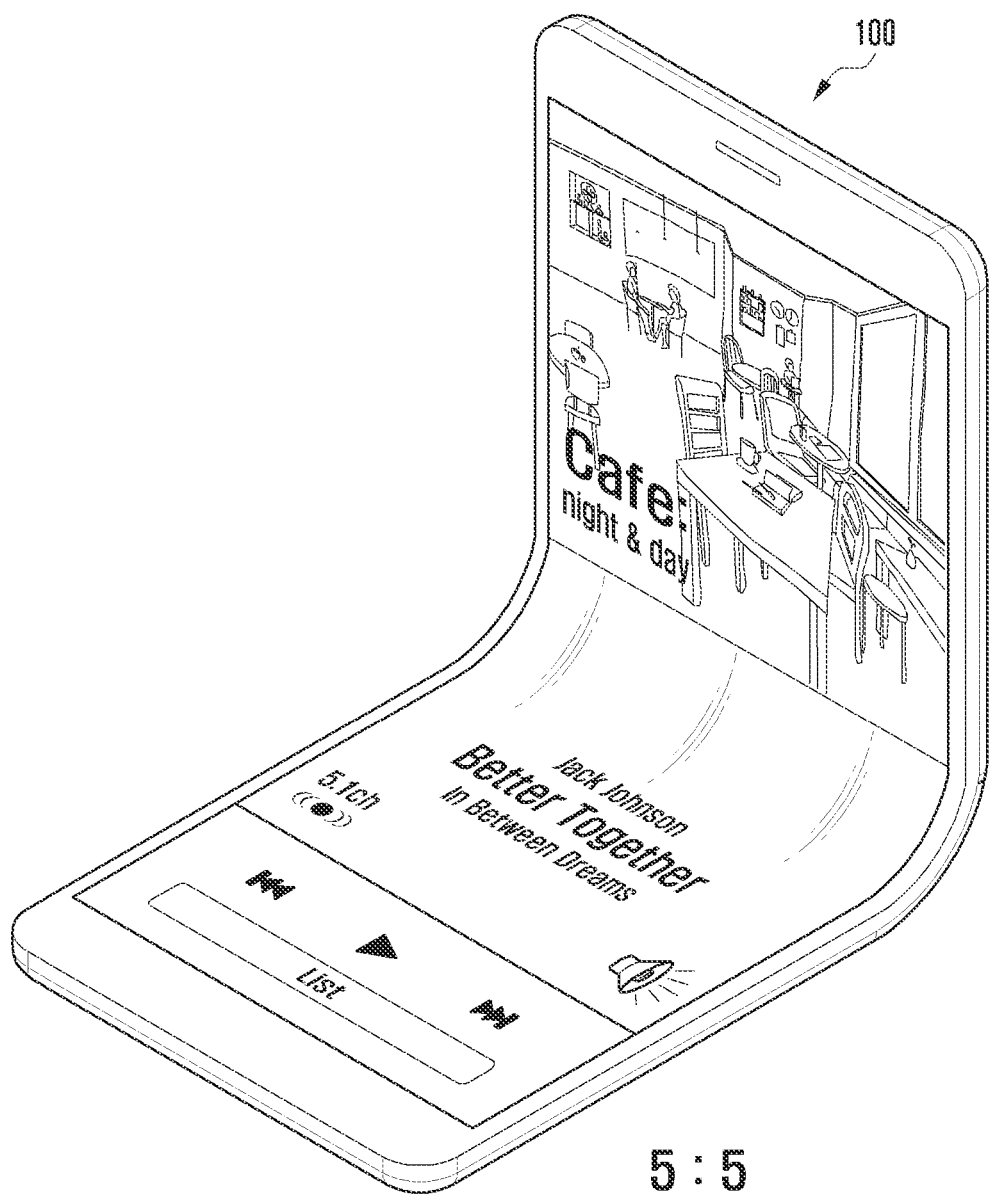

Referring to FIG. 11B, when the flexible portable terminal 100 is bent along a line A-A' which divides the folding portion 160 into an upper portion and a lower portion at a ratio of 5:5, the flexible portable terminal 100 is bent in which the upper and lower portions are divided at the ration of 5:5.

Figure 11C:

Referring to FIG. 11C, on the other hand, when the flexible portable terminal 100 is bent along a line B-B' which divides the folding portion 160 into the upper portion and the lower portion at a ratio of 3:7, the flexible portable terminal 100 is bent in which the upper and lower portions are divided at the ration of 3:7.

For example, in the state that the lower portion of the bent flexible portable terminal 100 is supported on the ground, and the upper portion is upright, the display unit at the lower portion may display a keyboard in the form of soft keys and the display unit at the upper portion may display an execution screen as an output of a signal input by the keyboard.

Figure 11D:
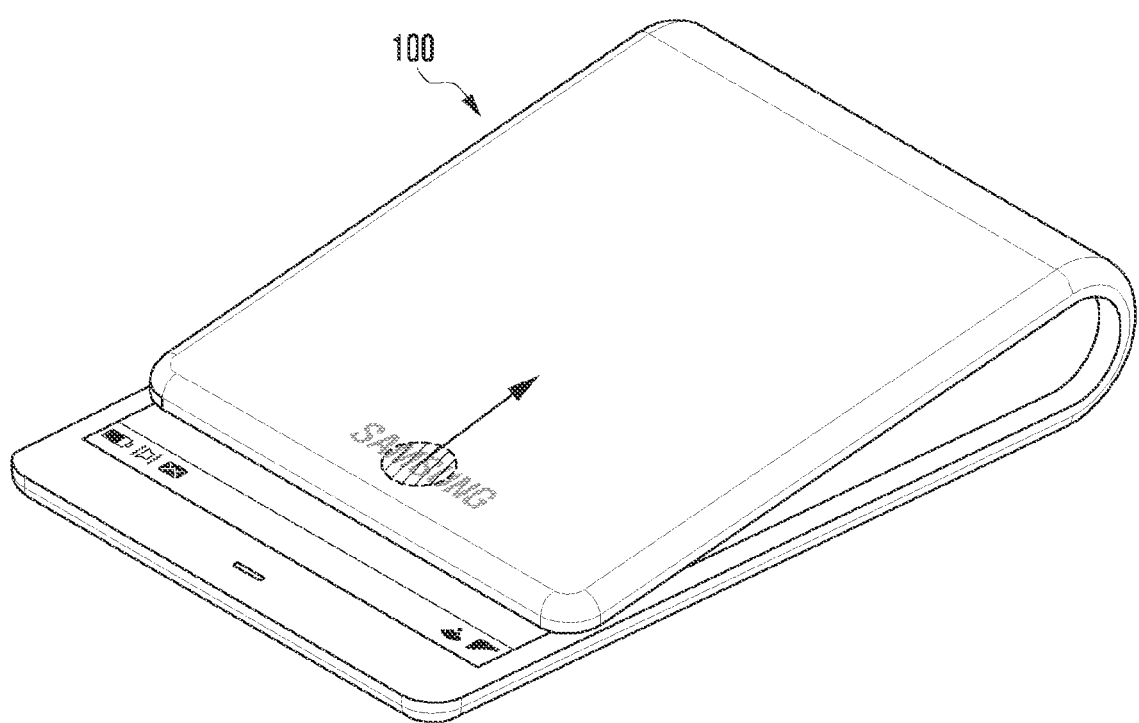

Referring to FIG. 11D, alternatively, when a user pushes back the upper portion of the flexible portable terminal 100 in which the flexible display unit 300 is folded in half in a direction to the front surface of the flexible portable terminal 100, by using his/her finger, an end of the flexible display unit 300 adhered to the lower portion of the flexible portable terminal 100 opposite to the upper portion is exposed.

As described above, an information window displayed on the exposed end of the flexible display unit 300 may be exposed. The exposed information window may display at least one of information on a battery state, information on a communication state, information on a message receiving state, information on a state of a certain executed application, and the like.

For example, in the state that the flexible portable terminal 100 is folded, when the upper portion or the lower portion of the flexible portable terminal 100 is pushed or drawn back by a force, the flexible portable terminal 100 may partially slide by the bending of the folding portion 160. Further, although the flexible portable terminal 100 is not completely opened by sliding, the user can identify minimum information on the flexible portable terminal 100 through a simple sliding operation.

On the other hand, as shown in FIG. 2 or FIG. 5, since the folding portion 160 has the front and rear surfaces on which the uneven structures are formed as described above, the elongation of the body 110 of the flexible portable terminal 100 increases even though the body 110 of the flexible portable terminal 100 is thick, while the flexible display unit 300 may be bent or folded because it is remarkably thin although it hardly has an elongation.

Due to the elongation, as the outside of the folding portion 160 which is opposite to the bending direction thereof is tensioned, and the inside of the folding portion 160 configured to bend is compressed when the flexible portable terminal 100 is bent or folded, the flexible display unit 300 is pushed in a direction to the outside of the flexible portable terminal 100, or is pulled in a direction to the inside of the flexible portable terminal 100.

More particularly, when the flexible portable terminal 100 is folded in a direction to the front surface thereof, the flexible display unit 300 is not compressed at a portion opposite to the folding portion 160, and an edge of the flexible display unit 300 may be pushed outwardly in proportion to the compression of the folding portion 160.

To the contrary, when the flexible portable terminal 100 is folded in a direction to the rear surface thereof, the flexible display unit 300 is not extended at the portion opposite to the folding portion 160, and the edge of the flexible display unit 300 may be pulled inwardly in proportion to the extension of the folding portion 160.

Therefore, when the flexible portable terminal 100 as described above is bent or folded, the flexible display unit 300 adhered to the body of the flexible portable terminal 100 may have problems in that it is separated from the body 110 of the flexible portable terminal 100, or the surface thereof is crushed or damaged because of a difference of the elongation of the folding portion 160 and the flexible display unit 300.

Accordingly, the embodiment of the present disclosure discloses a sliding portion which has a structure to address the above-mentioned problem and makes the flexible display unit 300 slide when the flexible portable terminal 100 is bent or folded, as shown in FIG. 6A.

Referring back to FIG. 6A, the sliding portions of the present disclosure may be provided to the upper and lower portions of the body 110 of the flexible portable terminal 100 around the folding portion 160, respectively. The upper sliding portion may include an upper slider 170, an upper slot 120 for defining a sliding range of the upper slider 170, and guide portions 131 and 132 for preventing the upper slider 170 from being separated. The lower sliding portion also includes a lower slider 172, a lower slot 122 and guide portions 141 and 142.

The flexible display unit 300 may be adhered to a convex surface 180 on at least one of multiple uneven structures of the folding portion 160, and to the surfaces of the upper and lower sliders 170 and 172. However, a portion at which the flexible display unit 300 is adhered to the body 110 of the flexible portable terminal 100 is not limited thereto.

The flexible display unit 300 for the flexible portable terminal 100 of the present disclosure may not be adhered to a whole surface 190 of the body 110 of the flexible portable terminal 100 but a part of the body 110 of the flexible portable terminal 100 in order to prevent any damage and separation of the flexible display unit 300 by the pushing or pulling of the flexible display unit 300 caused due to the elongation different from the folding portion 160 when the flexible portable terminal 100 is bent or folded.

Referring to FIG. 6B, in addition, the notch 222, which prevents the separation of the flexible display unit 300 and covers a gap between the flexible display unit 300 and the body 110 of the flexible portable terminal 100 in order not to expose the gap, may be formed over an edge of the body 110 of the flexible portable terminal 100 which is opposite to an edge of the flexible display unit 300.

Figure 12A:
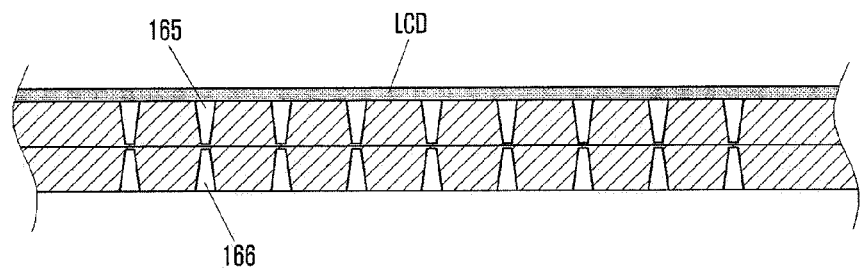
FIGS. 12A, 12B, and 12C illustrate an expanded state of a flexible portable terminal according to an embodiment of the present disclosure.
Figure 12B:
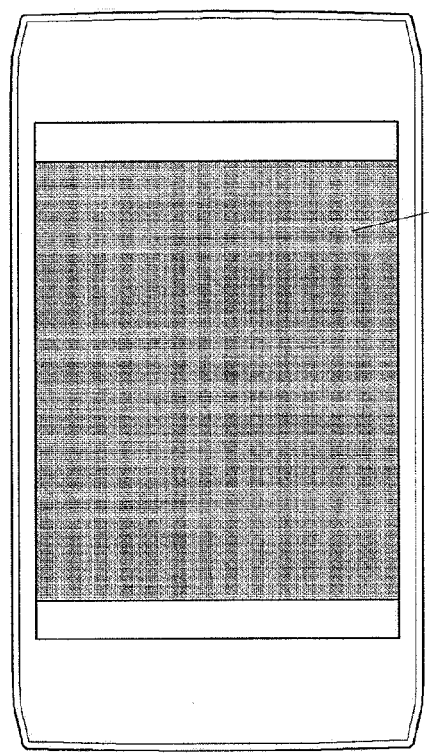
Figure 12C:
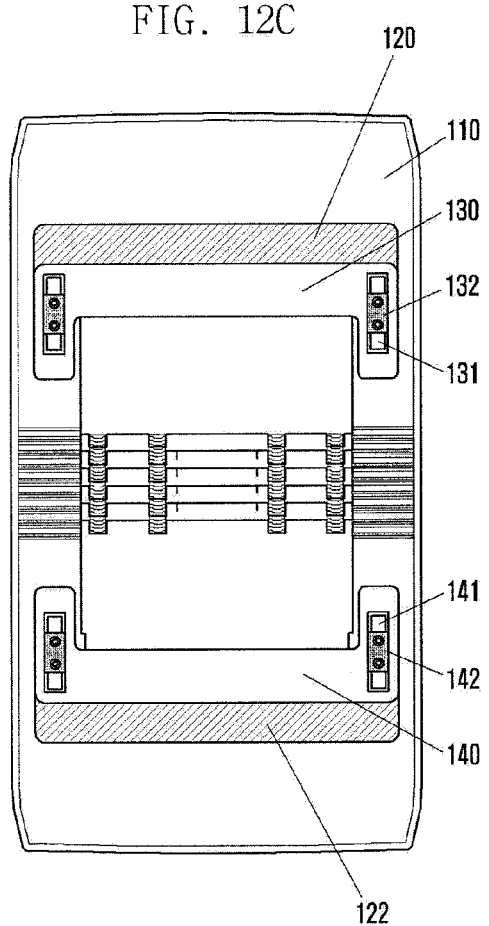

Hereinafter, the sliding portion will be described with reference to FIGS. 12A, 12B, 12C, 13A, 13B, 13C, 14A, 14B, and 14C. FIGS. 12A, 12B, and 12C illustrate an expanded state of a flexible portable terminal according to an embodiment of the present disclosure. FIGS. 13A, 13B, and 13C illustrate a flexible portable terminal bent in a front direction according to an embodiment of the present disclosure. FIGS. 14A, 14B, and 14C illustrate a flexible portable terminal bent in a rear direction according to an embodiment of the present disclosure.

Referring to FIGS. 12A, 12B, and 12C, it may be assumed that the sliders 130 and 140 slide to an intermediate portion of the slots 120 and 122 in the state that a designer expands the folding portion 160.

The upper sliding portion may include an upper slider 170, an upper slot 120 for defining a sliding range of the upper slider 170, and guide portions 131 and 132 for preventing the upper slider 170 from being separated. The lower sliding portion also includes a lower slider 172, a lower slot 122, and guide portions 141 and 142.

If the front surface of the flexible portable terminal 100 is exposed as shown in FIG. 12B and the folding portion 160 is expanded at an angle of 180 degrees so that the flexible display unit 300 is exposed, the folding portion 160 has a section in which it is expanded as shown in FIG. 12A.

The slider 130 of the upper sliding portion slides to the intermediate portion of the slot 120, and also the upper portion of the flexible display unit 300 adhered to the surface of the slider 130 slides simultaneously when the slider 130 slides as described above so that the upper portion of the flexible display unit 300 can be expanded without any separation from the body 110 of the flexible portable terminal 100 or any damage.

Similarly, the slider 140 of the lower sliding portion slides to the intermediate portion of the slot 122, and also the lower portion of the flexible display unit 300 adhered to the surface of the slider 140 slides simultaneously when the slider 140 slides as described above so that the lower portion of the flexible display unit 300 can be expanded without any separation from the body 110 of the flexible portable terminal 100 or any damage.

Referring to FIGS. 13A, 13B, and 13C, it may be assumed that the sliders 130 and 140 slide to an outermost portion of the slots 120 and 122 in the state that the designer folds the folding portion 160 in a direction to the front surface of the flexible portable terminal. The upper sliding portion may include an upper slider 170, an upper slot 120 for defining a sliding range of the upper slider 170, and guide portions 131 and 132 for preventing the upper slider 170 from being separated.

In the case that the front surface of the flexible portable terminal 100 is folded inwardly, the folding portion 160 has a section as shown in FIG. 13A. For example, the folding portion 160 is compressed at a folded inside thereof but tensioned at a folded outside thereof because of a high elongation due to the uneven structure on the front and rear surfaces, while the flexible display unit 300 is not compressed or tensioned at the folded inside and folded outside thereof because of a low elongation. Accordingly, an edge of the upper portion and an edge of the lower portion are elongated outwardly by the folding of the folding portion 160.

At this time, the slider 130 of the upper sliding portion slides to the outermost portion of the slot 120, and also the upper portion of the flexible display unit 300 adhered to the surface of the slider 130 slides to the outermost portion simultaneously when the slider 130 slides as described above so that the upper portion of the flexible display unit 300 can be expanded without any separation from the body 110 of the flexible portable terminal 100 or any damage.

Similarly, the slider 140 of the lower sliding portion slides to the outermost portion of the slot 122, and also the lower portion of the flexible display unit 300 adhered to the surface of the slider 140 slides to an outside direction simultaneously when the slider 140 slides as described above so that the lower portion of the flexible display unit 300 can be expanded without any separation from the body 110 of the flexible portable terminal 100 or any damage.

Further, since the flexible display unit 300 has an edge portion thereof covered with the notch 222 (see FIG. 6B) formed on the body 110 of the flexible portable terminal 100 to be opposite to the edge portion of the flexible display unit 300, it is possible to prevent the internal parts of the body 110 of the flexible portable terminal 100 from being exposed by the sliding movement of the flexible display unit 300 or to prevent the flexible display unit 300 from getting loose although the flexible display unit 300 slides as the flexible portable terminal 100 is bent or folded.

Here, a surface of the notch 222 which contacts the flexible display unit 300 is made from a material, such as Chamude, Suede, micro fiber, and the like, which protects a surface of the flexible display unit 300.

Referring to FIGS. 14A, 14B, and 14C, it may be assumed that the sliders 130 and 140 slide to an outermost portion of the slots 120 and 122 in the state that the designer folds the folding portion 160 in a direction to the rear surface of the flexible portable terminal. The upper sliding portion may include an upper slider 170, an upper slot 120 for defining a sliding range of the upper slider 170, and guide portions 131 and 132 for preventing the upper slider 170 from being separated.

In the case that the rear surface of the flexible portable terminal 100 is folded inwardly and the front surface of the flexible portable terminal 100 is folded outwardly, the folding portion 160 has a section as shown in FIG. 14A. For example, the folding portion 160 is compressed at the folded inside thereof and tensioned at the folded outside thereof because of the high elongation due to the uneven structure of the front and rear surfaces thereof On the other hand, the flexible display unit 300 is not compressed or tensioned at the folded inside and folded outside thereof because of the low elongation, and the edges of the upper and lower portions of the flexible display unit 300 are pulled inwardly due to the thickness of the body 110 of the flexible portable terminal 100 when the flexible display unit 300 is folded.

At this time, the slider 130 of the upper sliding portion slides to the outermost portion of the slot 120, and also the upper portion of the flexible display unit 300 adhered to the surface of the slider 130 slides inwardly simultaneously when the slider 130 slides as described above, so that the upper portion of the flexible display unit 300 can be pulled inwardly without any separation from the body 110 of the flexible portable terminal 100 or any damage.

Similarly, the slider 140 of the lower sliding portion, not shown in the drawings, slides to the outermost portion of the slot 122, and also the lower portion of the flexible display unit 300 adhered to the surface of the slider 140 slides inwardly simultaneously when the slider 140 slides as described above, so that the lower portion of the flexible display unit 300 can be pulled inwardly without any separation from the body 110 of the flexible portable terminal 100 or any damage.

Figure 15:
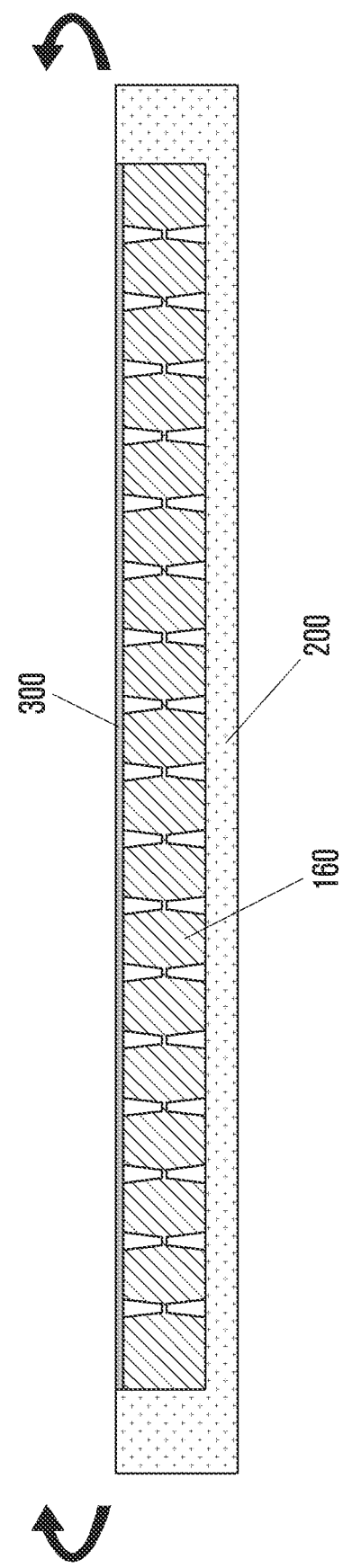
FIG. 15 illustrates a structure of a cover of a general portable terminal according to an embodiment of the present disclosure.
Figure 16:
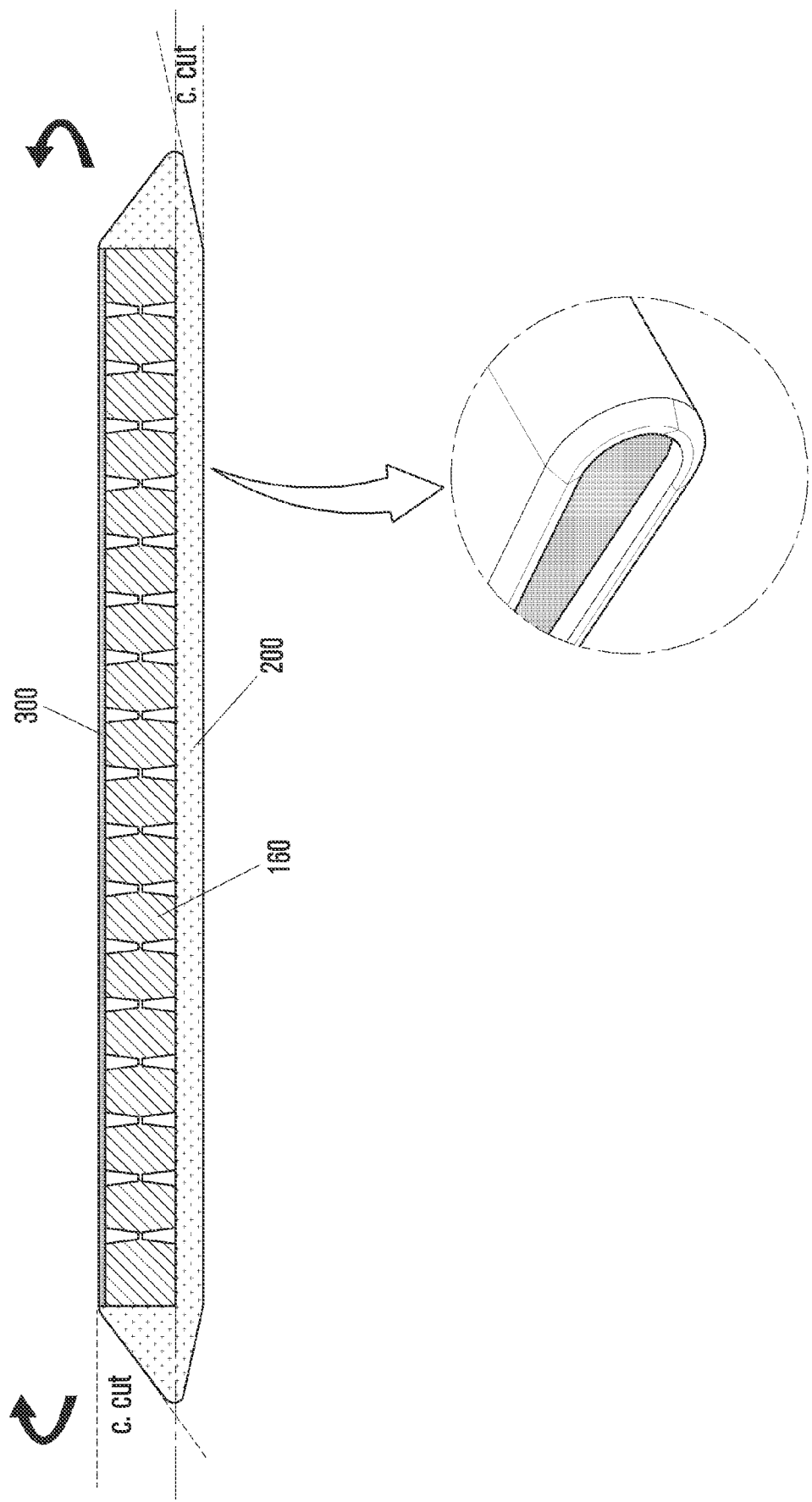
FIGS. 16 and 17 illustrate a structure of a cover of a flexible portable terminal according to an embodiment of the present disclosure.
Figure 17:
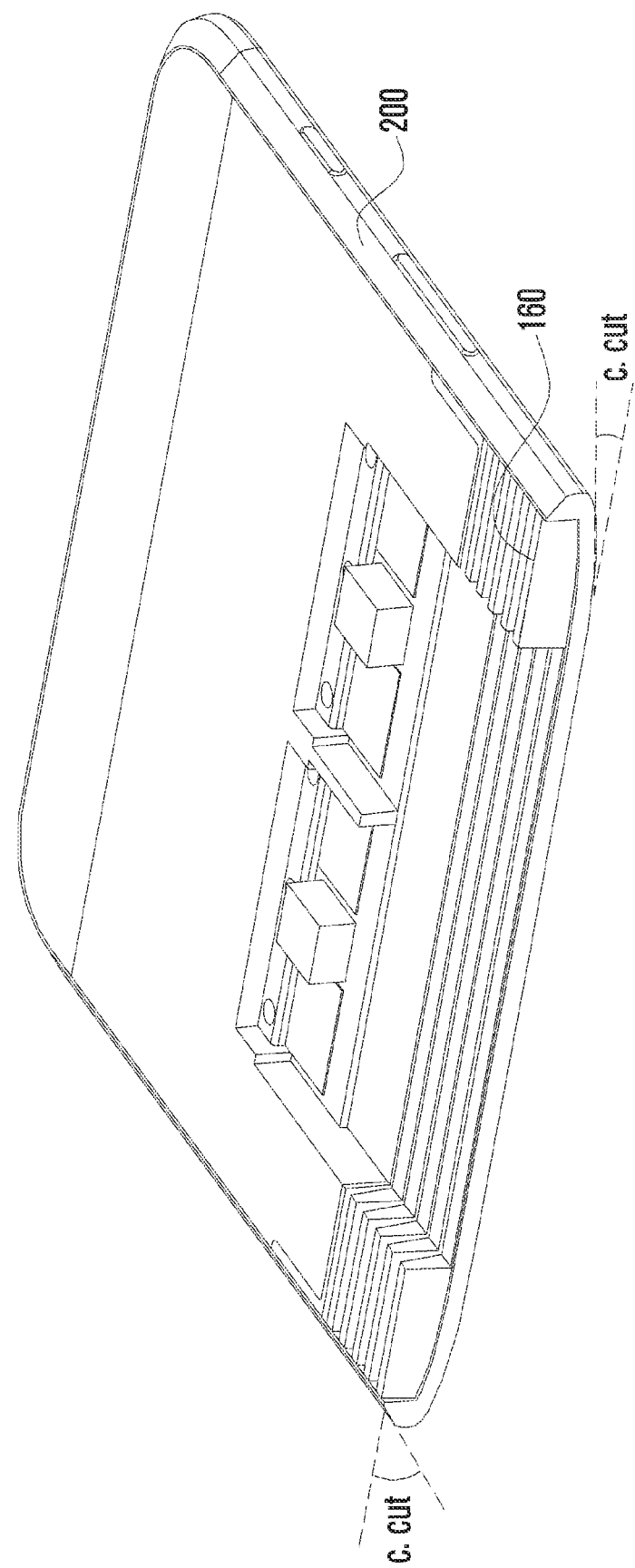

FIG. 15 illustrates a structure of a cover of a general portable terminal according to an embodiment of the present disclosure. FIGS. 16 and 17 illustrate a structure of a cover of a flexible portable terminal according to an embodiment of the present disclosure.

Referring to FIGS. 15, 16, and 17, a cover 200 of the flexible portable terminal 100 wrinkles or becomes open when the cover 200 surrounds three surfaces of the flexible portable terminal 100 except for the flexible display unit 300 for the one body type of the flexible portable terminal 100.

For example, a technology of manufacturing the edge of the cover 200 of the flexible portable terminal 100 which generally has a section as shown in FIG. 15, so that the edge of the cover 200 has a shape as shown in FIG. 16 is proposed.

More particularly, the edge of the cover 200 of the flexible portable terminal 100 is cut off (C.cut) at an end thereof contacting the flexible display unit 300. At this time, an oblique-line extends from the end of the cover 200 of the flexible portable terminal 100 to a line corresponding to a height of the folding portion 160. For example, an end of the cut-off portion, i.e., the oblique line, may be placed on the same plane as a surface of the folding portion 160. The edge region of the front surface of the cover 200 of the flexible portable terminal 100 may be referred to as a first cut-off portion.

Similarly, a cut-off portion (C.cut) may be formed from a surface of the cover 200 of the flexible portable terminal 100, which is opposite to the cover 200 of the flexible portable terminal 100 having the first cut-off portion formed thereon, to an edge of the cover 200 of the flexible portable terminal. At this time, the oblique-line extends from the surface of the cover 200 of the flexible portable terminal 100 to a line corresponding to a height of the folding portion 160. The edge region of the rear surface of the cover 200 of the flexible portable terminal 100 may be referred to as a second cut-off portion.

The first cut-off portion and the second cut-off portion are formed such that the edges of the cover 200 of the flexible portable terminal 100 are opposite to each other. The inclined angles of the first and second cut-off portions may be different from each other since the folding portion 160 and the cover 200 of the flexible portable terminal 100 have different thicknesses respectively.

An embodiment of the present disclosure has a characteristic in that the edge portion of the cover 200 of the flexible portable terminal 100, which is made of a soft material and is adjacent to the folding portion 160 made of a hard material is cut off.

Accordingly, although the flexible portable terminal 100 is folded in the direction to the front surface or the rear surface thereof, it is possible that the first cut-off portion formed at the edge of the cover 200 of the flexible portable terminal 100 prevents the folded portion of the cover 200 of the flexible portable terminal 100 from wrinkling, being deformed, becoming open, and the like, due to the difference of the elongation between the hard material and the soft material.

Figure 18:
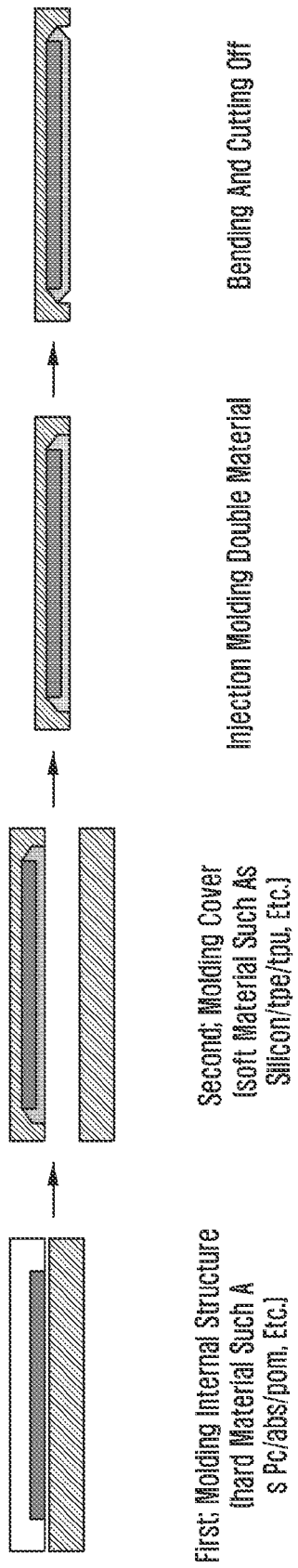
FIG. 18 is a sectional view illustrating a process of manufacturing a flexible portable terminal according to an embodiment of the present disclosure.

FIG. 18 is a sectional view illustrating a process of manufacturing a flexible portable terminal according to an embodiment of the present disclosure.

Referring to FIG. 18, the body 110 of the flexible portable terminal 100 including the folding portion 160, and the cover 200 of the flexible portable terminal 100 may be formed by a double injection molding. After the body 110 of the flexible portable terminal 100 is firstly molded as an internal structure, a surface of the body 110 of the flexible portable terminal 100 is exposed.

Here, the body 110 of the flexible portable terminal 100 may be formed of the hard material, such as at least one of non-metal materials including Acrylonitrile-Butadiene-Styrene (ABS) blend, Polycarbonate (PC), Polyoxymethylene (POM) acetal resin, and the like, which are plastic resin composition.

An cover molding is secondly performed around the body 110 of the flexible portable terminal 100, and the cover 200 of the flexible portable terminal 100 is molded on the body 110 of the exposed flexible portable terminal 100 and the over molded portion. While the cover molding, the periphery of the body 110 of the flexible portable terminal 100 is molded to be inclined so that the second cut off portion is formed at the edge of the cover 200 of the flexible portable terminal 100.

Here, the cover 200 of the flexible portable terminal 100 may be formed of a soft material, such as at least one of rubber, urethane, silicon, leather, TPE, TPU, and the like, or at least one combination thereof Thus, the double injection molding can be achieved by a different kind of materials.

Thereafter, the edge of the cover 200 of the flexible portable terminal 100 may be partially etched in order to form the first cut off portion.

The flexible portable terminal of the present disclosure is capable of bending at different angles.

More particularly, when the flexible portable terminal is bent, an end of the flexible display device is enabled to slide according to a compression and a tension of the flexible display unit caused by a difference of elongation between a bending portion of a body of the portable terminal and the flexible display unit, thereby preventing the flexible display unit from being separated from the body of the portable terminal or being damaged.

Further, the present disclosure maintains a bending state by variously adjusting a ratio of an upper portion to a lower portion of the flexible portable terminal, thereby cradling the flexible portable terminal at various angles, and facilitating operation and convenient carrying of the flexible portable terminal.

In addition, in the structure of maintaining the folding state of the flexible portable terminal according to the present disclosure, magnetism is removed from the flexible portable terminal, thereby having no electric and physical effects on functioning and operating of the flexible portable terminal, and improving reliability of the flexible portable terminal.

On the other hand, the various embodiments of the present disclosure disclosed in the description and the drawings are merely examples to easily describe technical contents of the present disclosure and to help understand the present disclosure, and do not limit the scope of the present disclosure. For example, it is obvious to those skilled in the art to which the present disclosure belongs that different modifications can be achieved based on the technical spirit of the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible portable apparatus comprising:
   a flexible portable terminal having a body and a folding portion configured to bend at one end of the body in a direction to a front surface or a rear surface of the flexible portable terminal;
   a flexible display unit configured to be mounted on the body of the flexible portable terminal, and to bend in the front surface or the rear surface of the flexible portable terminal according to a bending direction of the folding portion;
   a sliding portion configured to enable one end of the flexible display unit to slide according to a difference of a compression or tension caused by a difference of an elongation between the folding portion and the flexible display unit when the folding portion is bent; and
   a notch, which is formed on the body of the flexible portable terminal so as to be opposite to an edge of the flexible display unit, configured to cover a part of the edge of the flexible display unit even when the flexible display unit slides.

2. The apparatus of claim 1, wherein the folding portion comprises a free stop hinge unit configured to maintain a bending state of the folding portion.

3. The apparatus of claim 2, wherein the folding portion has uneven structures formed on the front surface and the rear surface of the body of the flexible portable terminal.

4. The apparatus of claim 3, wherein the free stop hinge unit is disposed across at least one uneven structure formed on the body of the flexible portable terminal.

5. The apparatus of claim 3, further comprising a cover of the flexible portable terminal is configured to surround side surface and the rear surface of the flexible portable terminal except for the flexible display unit.

6. The apparatus of claim 5, wherein a minimum value which the flexible display unit maintains is determined based on at least one of a length of a topside of the folding portion, a thickness of the folding portion, numbers of the folding portion, a length of a saw-tooth and an angel between adjacent uneven structures.

7. The apparatus of claim 6, further comprising:
   wherein the length of a saw-tooth is determined based on an Equation, $$Z=2\times(x/2\times\cos\theta+t)\times(\theta/360°)\times\pi=(\theta/180°)\times(x/2\times\cos\theta+t)\times\pi$$

in which x is the minimum value, y is a length of a topside of the folding portion, t is a thickness of the folding portion, n is numbers of the folding portions, Z is the length of a saw-tooth, Z' is a length of a curved surface, and 2θ is an angle between adjacent uneven portions, when the length of a saw-tooth is identical to the length of a curved surface.

8. The apparatus of claim 5, wherein an edge of the cover of the flexible portable terminal comprises a cut-off portion which is obliquely cut from an end of the edge contacting the flexible display unit.

9. The apparatus of claim 8, wherein the cut-off portion is formed from an end of the cover of the flexible portable terminal contacting the flexible display unit to a line corresponding to a height of the folding portion.

10. The apparatus of claim 1, wherein the sliding portion is further configured to enable the one end of the flexible display unit to slide in a direction to a side of the flexible portable terminal according to the difference of the elongation between the folding portion and the flexible display unit when the folding portion is bent in a direction to the front surface of the flexible portable terminal.

11. The apparatus of claim 1, wherein the sliding portion is further configured to enable the one end of the flexible display unit to slide in a direction to an inside of the flexible portable terminal according to the difference of the elongation between the folding portion and the flexible display unit and a thickness of the body of the flexible portable terminal when the folding portion is bent in a direction to the rear surface of the flexible portable terminal.

12. The apparatus of claim 1, wherein the sliding portions are disposed at an upper portion and a lower portion of the body of the flexible portable terminal respectively.

13. The apparatus of claim 12, wherein the sliding portions comprise:
a slider;
a slot configured to define a sliding range of the slider, and is formed by etching a part of the surface of the body of the flexible portable terminal; and
guide portions configured to guide a sliding of the slider at both ends of the slot.

14. The apparatus of claim 12, wherein the flexible display unit is configured to be adhered to at least one convex surface in a central region among multiple uneven structures of the folding portion, and to be adhered to the sliding surfaces of the upper portion and the lower portion of the body.

15. The apparatus of claim 1, wherein the notch is further configured to cover the body of the flexible portable terminal which is exposed by a sliding movement of the flexible display unit.

16. The apparatus of claim 1, further comprising a hook provided to one end of the flexible portable terminal, and a hook groove which is formed at the other end opposite to the one end of the flexible portable terminal and coupled with the hook when the flexible portable terminal is folded.

17. The apparatus of claim 1, wherein the flexible display unit comprises at least one of a Liquid Crystal Display (LCD) unit, an Organic Light Emitting Diode (OLED) display unit, and an Electrophoretic Display (EPD) unit.

18. A flexible portable apparatus comprising:
a flexible portable terminal having a body and a folding structure;
a flexible display unit configured to output a display screen by the flexible portable terminal;
a hook provided at one end of the flexible portable terminal and a hook groove provided at the other end opposite to the one end of the flexible portable terminal and coupled with the hook when the flexible portable terminal is folded,
wherein the body of the flexible portable terminal has one surface on which the folding structure is formed being configured to bend upper and lower portions of the flexible portable terminal at a desired angle in a direction to a front surface or a rear surface of the flexible portable terminal, and the other surface on which a sliding structure is disposed to make one end of the flexible display unit slide according to the bending of the flexible portable terminal.

19. The apparatus of claim 18, wherein the flexible display unit comprises at least one of a Liquid Crystal Display (LCD) unit, an Organic Light Emitting Diode (OLED) display unit, and an Electrophoretic Display (EPD) unit.

20. A flexible portable apparatus comprising:
a flexible portable terminal having a body and a folding portion configured to bend at one end of the body in a direction to a front surface or a rear surface of the flexible portable terminal;
a flexible display unit configured to be mounted on the body of the flexible portable terminal, and to bend in the front surface or the rear surface of the flexible portable terminal according to a bending direction of the folding portion; and
a sliding portion configured to enable one end of the flexible display unit to slide according to a difference of a compression or tension caused by a difference of an elongation between the folding portion and the flexible display unit when the folding portion is bent,
wherein the folding portion has uneven structures formed on the front surface and the rear surface of the body of the flexible portable terminal.

\* \* \* \* \*